(12) United States Patent
Feucht et al.

(10) Patent No.: US 7,140,213 B2
(45) Date of Patent: Nov. 28, 2006

(54) STEERING COLUMN LOCK APPARATUS AND METHOD

(75) Inventors: Michael G. Feucht, Menomonee Falls, WI (US); David C. Janssen, Whitefish Bay, WI (US); William P. Schuster, III, Germantown, WI (US)

(73) Assignee: Strattec Security Corporation, Milwaukee, WI (US)

( * ) Notice: Subject to any disclaimer, the term of this patent is extended or adjusted under 35 U.S.C. 154(b) by 0 days.

(21) Appl. No.: 10/783,394

(22) Filed: Feb. 21, 2004

(65) Prior Publication Data

US 2005/0183476 A1 Aug. 25, 2005

(51) Int. Cl.
*B60R 25/02* (2006.01)
(52) U.S. Cl. .......................... 70/186; 70/252
(58) Field of Classification Search .......... 70/182–186, 70/252
See application file for complete search history.

(56) References Cited

U.S. PATENT DOCUMENTS

| 347,070 | A | 8/1886 | Sedgwick |
|---|---|---|---|
| 421,567 | A | 2/1890 | Grah, Jr. |
| 1,347,564 | A | 7/1920 | Turner |
| 1,668,147 | A | 5/1928 | Hershey |
| 2,478,016 | A | 8/1949 | Sandberg |
| 3,241,344 | A | 3/1966 | Peters |
| 3,336,770 | A | 8/1967 | Parsons |
| 3,590,611 | A | 7/1971 | Nakashima |
| 3,613,412 | A | 10/1971 | Yamaguchi |
| 3,680,335 | A | 8/1972 | Onishi |
| 3,709,006 | A | 1/1973 | Seidewand |
| 3,779,332 | A | 12/1973 | Snitgen |
| 3,789,636 | A | 2/1974 | Nakashima |
| 3,959,996 | A | 6/1976 | Thirion |
| 4,137,985 | A | 2/1979 | Winchell |
| 4,248,070 | A | 2/1981 | Eichenauer |
| 4,250,976 | A | 2/1981 | Mochida |
| 4,286,305 | A | 8/1981 | Pilat et al. |
| 4,332,306 | A | 6/1982 | Turatti |
| 4,366,466 | A | 12/1982 | Lutz |
| 4,414,830 | A | 11/1983 | Maiocco |
| 4,426,864 | A | 1/1984 | Morikawa |
| 4,427,967 | A | 1/1984 | Maiocco |
| 4,428,024 | A | 1/1984 | Mochida et al. |
| 4,466,262 | A | 8/1984 | Maiocco et al. |
| 4,487,042 | A | 12/1984 | Mochida et al. |
| 4,495,786 | A | 1/1985 | Masaki et al. |
| 4,583,148 | A | 4/1986 | Lipschutz |
| 4,603,564 | A | 8/1986 | Kleinhany et al. |
| 4,638,882 | A | 1/1987 | Sato |
| 4,643,009 | A | 2/1987 | Sato |

(Continued)

FOREIGN PATENT DOCUMENTS

DE 2035282 1/1972

(Continued)

*Primary Examiner*—Suzanne Dino Barrett
(74) *Attorney, Agent, or Firm*—Michael Best & Friedrich LLP

(57) ABSTRACT

A lock bolt extendible and retractable by movement of a power transmission assembly driven by an actuator and having a cam thereon which cams against the lock bolt to retract the lock bolt and unlock the steering column. In some embodiments, the cam has a curved surface with varying distance from the axis of rotation of the cam or pivot to improved lock bolt motion. The cam can have a gradual ramp surface to extract a lock bolt even in binding conditions of the lock bolt.

18 Claims, 13 Drawing Sheets

U.S. PATENT DOCUMENTS

| | | | |
|---|---|---|---|
| 4,685,313 A | 8/1987 | Neyret | |
| 4,716,748 A | 1/1988 | Watanuki et al. | |
| 4,761,645 A | 8/1988 | Mochida | |
| 4,773,241 A | 9/1988 | Peitsmeier et al. | |
| 4,827,744 A | 5/1989 | Namazue et al. | |
| 4,848,115 A | 7/1989 | Clarkson et al. | |
| 4,875,724 A | 10/1989 | Gruber | |
| 4,875,726 A | 10/1989 | Thau | |
| 4,898,010 A | 2/1990 | Futami et al. | |
| 4,904,004 A | 2/1990 | Bartczak | |
| 4,929,007 A | 5/1990 | Bartczak et al. | |
| 4,939,915 A | 7/1990 | Vonlanthen | |
| 4,949,526 A | 8/1990 | Brogna et al. | |
| 4,982,584 A | 1/1991 | Takeda et al. | |
| 5,000,495 A | 3/1991 | Wolfgang et al. | |
| 5,035,528 A | 7/1991 | Thau | |
| 5,036,687 A | 8/1991 | Takeuchi et al. | |
| 5,056,344 A | 10/1991 | Bartczak | |
| 5,106,134 A | 4/1992 | Thau | |
| 5,125,698 A | 6/1992 | Thau | |
| 5,209,531 A | 5/1993 | Thau | |
| 5,255,547 A | 10/1993 | Burr et al. | |
| 5,271,252 A | 12/1993 | Yasuhara et al. | |
| 5,315,851 A | 5/1994 | Kuroki | |
| 5,343,077 A | 8/1994 | Yoshida et al. | |
| 5,398,532 A | 3/1995 | Janssen et al. | |
| 5,454,238 A | 10/1995 | Ross et al. | |
| 5,495,732 A | 3/1996 | Nagae et al. | |
| 5,654,689 A | 8/1997 | Peyre et al. | |
| 5,656,867 A | 8/1997 | Kokubu | |
| 5,656,868 A | 8/1997 | Gottlieb et al. | |
| 5,664,405 A | 9/1997 | Perego | |
| 5,718,132 A | 2/1998 | Riefe et al. | |
| 5,808,372 A | 9/1998 | Schwegler et al. | |
| 5,808,543 A | 9/1998 | Peyre | |
| 5,811,887 A | 9/1998 | Peyre et al. | |
| 5,893,429 A | 4/1999 | Hackl et al. | |
| 5,896,765 A | 4/1999 | Peyre et al. | |
| 5,965,955 A | 10/1999 | Takanohashi | |
| 5,982,295 A | 11/1999 | Goto et al. | |
| 5,990,574 A | 11/1999 | Lecznar et al. | |
| 5,992,263 A | 11/1999 | Bleuel et al. | |
| 6,003,349 A | 12/1999 | Nagae et al. | |
| 6,006,561 A | 12/1999 | Hill et al. | |
| 6,011,321 A | 1/2000 | Stancu et al. | |
| 6,040,638 A | 3/2000 | Howell | |
| 6,053,067 A | 4/2000 | Garnault et al. | |
| 6,067,007 A | 5/2000 | Gioia | |
| 6,067,824 A | 5/2000 | Osborne | |
| 6,076,382 A * | 6/2000 | Naganuma | 70/186 |
| 6,078,293 A | 6/2000 | Yamamoto | |
| 6,107,914 A | 8/2000 | Greene | |
| 6,125,671 A | 10/2000 | Suzuki | |
| 6,127,922 A | 10/2000 | Roddy et al. | |
| 6,233,986 B1 | 5/2001 | Suzuki et al. | |
| 6,234,039 B1 * | 5/2001 | Garnault et al. | 74/492 |
| 6,295,848 B1 | 10/2001 | Suzuki | |
| 6,324,878 B1 | 12/2001 | Ramamurthy et al. | |
| 6,364,379 B1 | 4/2002 | Roberts et al. | |
| 6,367,231 B1 | 4/2002 | Yamamoto | |
| 6,397,564 B1 | 6/2002 | Yamamoto | |
| 6,418,703 B1 | 7/2002 | Yamamoto | |
| 6,508,088 B1 | 1/2003 | Barbier et al. | |
| 6,527,500 B1 | 3/2003 | Gelardi et al. | |
| 6,571,587 B1 * | 6/2003 | Dimig et al. | 70/186 |
| 6,755,058 B1 * | 6/2004 | Zillmann | 70/252 |
| 6,764,428 B1 * | 7/2004 | Rudolph et al. | 477/99 |
| 6,826,934 B1 * | 12/2004 | Canard | 70/186 |
| 6,862,907 B1 * | 3/2005 | Hayashi et al. | 70/186 |
| 6,941,781 B1 * | 9/2005 | Fukushima | 70/252 |
| 2001/0025516 A1 * | 10/2001 | Starken | 70/186 |
| 2004/0003632 A1 * | 1/2004 | Ohtaki et al. | 70/252 |
| 2004/0027239 A1 * | 2/2004 | Hayashi et al. | 340/5.61 |
| 2004/0031299 A1 * | 2/2004 | Dimig et al. | 70/186 |
| 2004/0069025 A1 * | 4/2004 | Dubay et al. | 70/186 |
| 2004/0107750 A1 * | 6/2004 | Fukushima | 70/186 |
| 2004/0182121 A1 * | 9/2004 | Fukatsu et al. | 70/186 |
| 2004/0206139 A1 * | 10/2004 | Imai | 70/186 |
| 2004/0250577 A1 * | 12/2004 | Watanuki et al. | 70/186 |
| 2005/0034493 A1 * | 2/2005 | Wittwer et al. | 70/186 |
| 2005/0138977 A1 * | 6/2005 | Suzuki et al. | 70/186 |

FOREIGN PATENT DOCUMENTS

| | | |
|---|---|---|
| DE | 3344411 | 6/1985 |
| DE | 3611483 | 9/1987 |
| DE | 3739172 | 2/1989 |
| DE | 4434655 | 4/1995 |
| EP | 94568 | 11/1983 |
| EP | 240724 | 10/1987 |
| IT | 315310 | 2/1934 |
| JP | 2-24243 | 1/1990 |

* cited by examiner

STEERING COLUMN LOCK APPARATUS AND METHOD

BACKGROUND OF THE INVENTION

Numerous devices and methods exist for locking a vehicle steering column from movement or for otherwise rendering the steering structure of a vehicle unusable. Most commonly, such devices and methods prevent the steering column from being rotated to steer the vehicle. The vehicle can be a car, van, truck, motorcycle, bus, or all-terrain vehicle having a number of wheels, a boat with one or more rudders, a snowmobile with skis, any vehicle having one or more tracks, and the like. A steering column lock used in any such vehicle is typically employed to prevent vehicle theft or unauthorized use.

A popular and well-known mechanism for locking a steering column is a lock bolt that is directly or indirectly releasably engagable with the steering column. Such engagement can be by removable insertion of the lock bolt into a groove, a notch, teeth, or other aperture or feature in the steering column or in a gear, plate, or other element connected to the steering column. Also, the lock bolt can be spring-biased into a locking position in a number of different manners. A mechanism is normally provided for retracting the lock bolt from the steering column (whether against spring-loaded force or otherwise) for vehicle operation. As is well known to those skilled in the art, the mechanism can retract the lock bolt in response to user insertion and turning of a key or in response to one or more signals from a control system coupled to an actuator driving the mechanism.

A familiar problem with many conventional steering column locks is the ability of the lock bolt to be retracted from its locked position while torque is exerted upon the steering column. Such a force can bind the lock bolt to prevent or resist retraction of the lock bolt from its locked position, and can present retraction problems regardless of whether the lock bolt is retracted by mechanical force from turning a key or by an actuator driving the lock bolt as described above. For example, after the lock bolt has been extended to a locked position into a groove, notch, or other aperture as described above, a turning force from the front wheels can bind the lock bolt in this position. In many cases, the user must turn the steering wheel to release the binding force upon the lock bolt in order to turn the ignition key, retract the lock bolt, and thereby unlock the steering column.

While lock bolt binding is not necessarily a critical design flaw in conventional manually-actuated steering column locks, it can present greater problems in newer steering column locks that are not mechanically connected to an ignition lock cylinder for actuation thereby. For example, with the introduction in recent years of vehicle security systems in which a steering column lock is locked and unlocked by an electronic controller connected to one or more steering column lock actuators, there is little need to locate a vehicle's ignition control (e.g., switch, button, and the like) adjacent to the steering column lock. The ignition control can be directly or indirectly connected to the steering column lock by wiring alone, and therefore can be located almost anywhere in the vehicle. Also, in some cases the steering column lock need not necessarily be responsive to the ignition control of the vehicle, but can instead be responsive to a lock controller operable independently of the vehicle's ignition control. However, without the ability of a user to mechanically manipulate the lock bolt as in most older steering column lock designs described above, reliable lock bolt disengagement can be a significant problem, particularly when the lock bolt is subjected to binding forces.

In light of the problems and limitations of conventional steering column locks, new steering column lock designs would be welcome in the art.

SUMMARY OF THE INVENTION

Some embodiments of the present invention provide a vehicular lock comprising a frame, a lock bolt movable from an extended and locked position to a retracted and unlocked position, a follower movable with the lock bolt, a pivot rotatably coupled to the frame, an actuator drivably coupled to the pivot, and a cam coupled to the pivot, driven by rotation of the pivot, and in contact with the follower, wherein the cam is rotatable to move the lock bolt from the extended and locked position to the retracted and unlocked position, and has an asymmetric profile with respect to the pivot in which the asymmetric profile is defined at least in part by a first sector corresponding to the locked position of the lock bolt, a second sector corresponding to the unlocked position of the lock bolt, a third sector having a changing radial dimension defining a ramped surface from an end of the first sector to a beginning of the second sector, and a fourth sector extending between an end of the second sector to a beginning of the first sector, wherein the third sector is defined by a greater circumferential portion of the cam than the fourth sector.

In another aspect of the present invention, a steering column lock is provided, and comprises a frame, a lock bolt moveable from an extended and locked position to a retracted and unlocked position, a follower movable with the lock bolt, a pivot rotatably coupled to the frame, an actuator drivably coupled to the pivot; and a cam coupled to the pivot, driven by rotation of the pivot, and in contact with the follower, wherein the cam is rotatable to move the lock bolt from the extended and locked position to the retracted and unlocked position, and has an asymmetric profile with respect to the pivot, the asymmetric profile defined at least in part by a first sector corresponding to the locked position of the lock bolt, a second sector corresponding to the unlocked position of the lock bolt, and a third sector having a changing radial dimension defining a ramped surface from an end of the first sector to a beginning of the second sector, wherein the third sector is defined by a greater circumferential portion of the cam than each of the first and second sectors.

In some embodiments, a vehicular lock is provided, and comprises a frame, a lock bolt having a follower surface and movable from an extended and locked position to a retracted and unlocked position, a pivot rotatably coupled to the frame, an actuator drivably coupled to the pivot, a cam coupled to the pivot, driven by rotation of the pivot, in camming contact with the follower surface, and rotatable to move the lock bolt from the extended and locked position to the retracted and unlocked position, and first and second sensors positioned to sense the rotational position of the cam, wherein the first sensor is located less than one-hundred and eighty degrees about the pivot from the second sensor.

Some embodiments of the present invention provide a method of moving a lock bolt from a locked position to an unlocked position, wherein the method comprises biasing a follower against a cam having a first sector rotatable into contact with the follower in the locked position of the lock bolt, a second sector rotatable into contact with the follower in the unlocked position of the lock bolt, and third sector located between the first and second sectors and defining a greater circumferential portion of the cam than either of the first and second sectors, rotating the cam, camming the follower upon a surface of the first sector toward the third sector, moving the follower from the first sector to the third sector, camming the follower upon a surface of the third sector having a increasing radius, moving the bolt from the locked position toward the unlocked position by camming the follower upon the surface of the third sector, moving the follower from the third sector to the second sector; and camming the follower upon a surface of the second sector.

Another aspect of the present invention provides a method of moving a lock bolt from a locked position to an unlocked position, comprising placing the lock bolt in the locked position, rotating a cam in a rotational direction with a motor, disposing the cam against a follower surface by rotating the cam in the first rotational direction, retracting the lock bolt from the locked position by disposing the cam against the follower, detecting a rotational position of the cam with a sensor, braking the motor responsive to detecting the rotational position of the cam, decelerating the cam by braking the motor, and stopping the motor and cam while the lock bolt is in the unlocked position.

More information and a better understanding of the present invention can be achieved by reference to the following drawings and detailed description.

BRIEF DESCRIPTION OF THE DRAWINGS

The present invention is further described with reference to the accompanying drawings, which illustrate embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE ILLUSTRATED EMBODIMENTS

Figure 1:
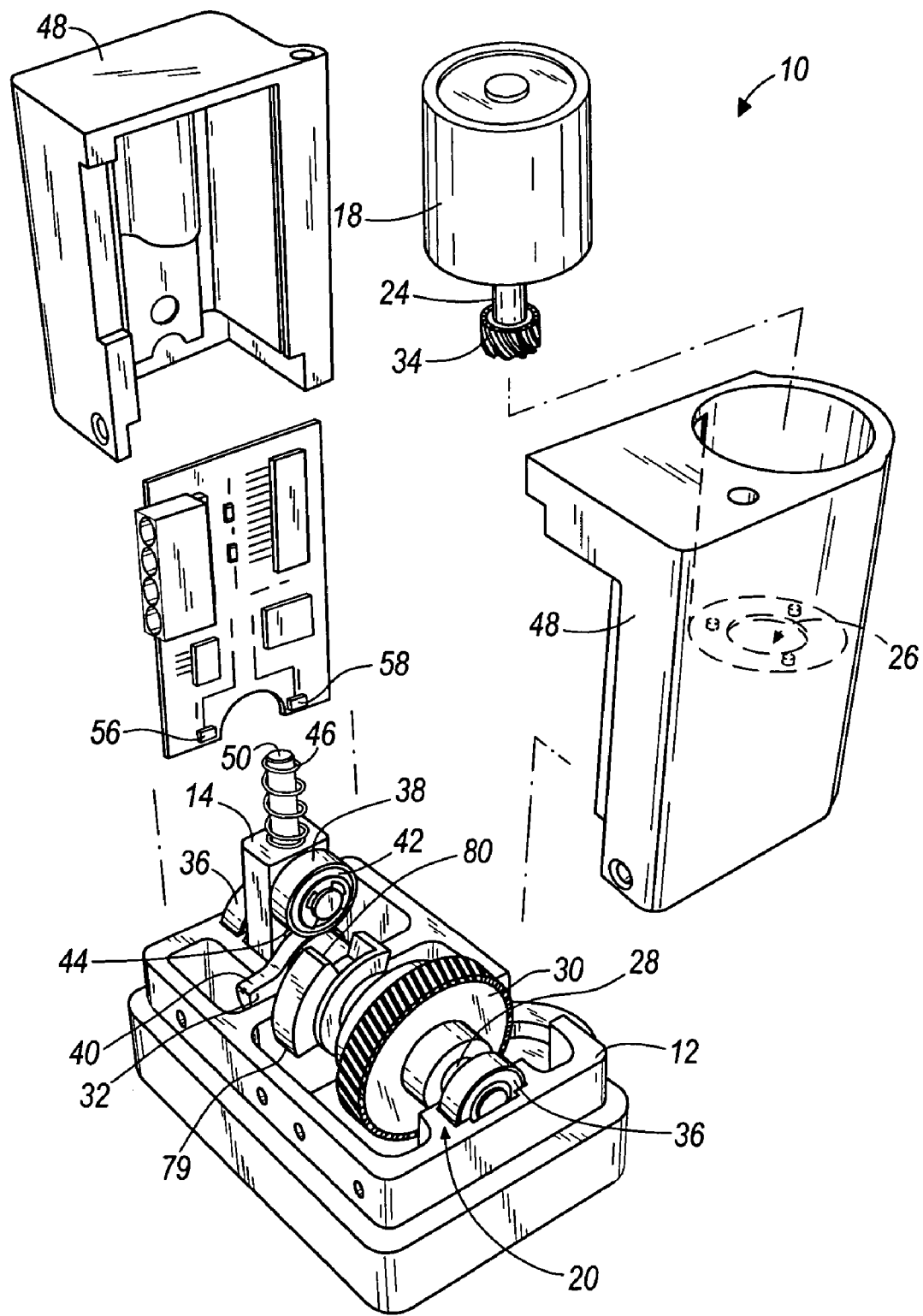
FIG. 1 is a perspective view of a steering column lock assembly according to an exemplary embodiment of the present invention, shown with the cover removed and the bolt in a locked position.
Figure 2:
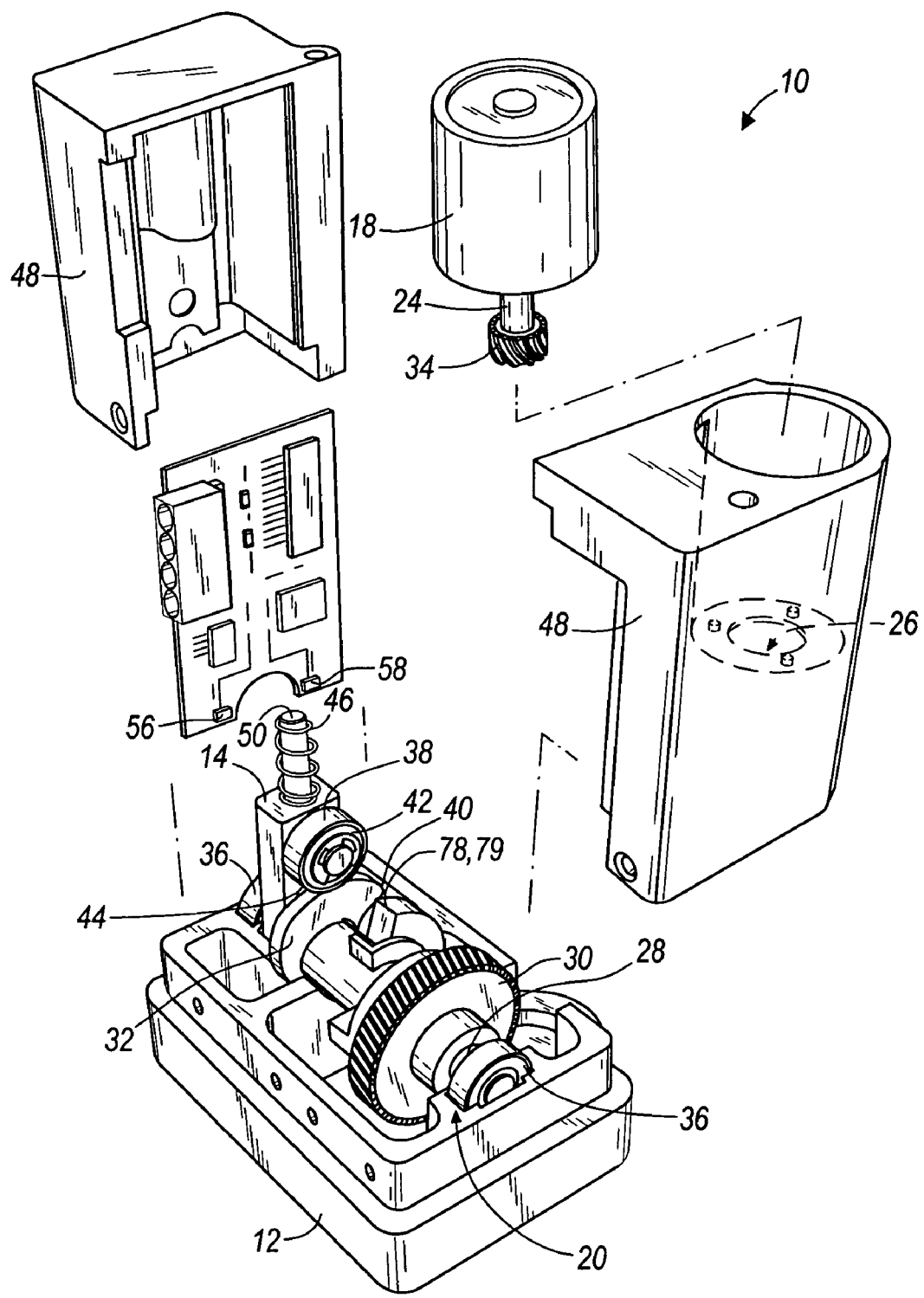
FIG. 2 is a perspective view of the steering column lock assembly illustrated in FIG. 1, shown with the cover removed and the bolt in an unlocked position.
Figure 3:
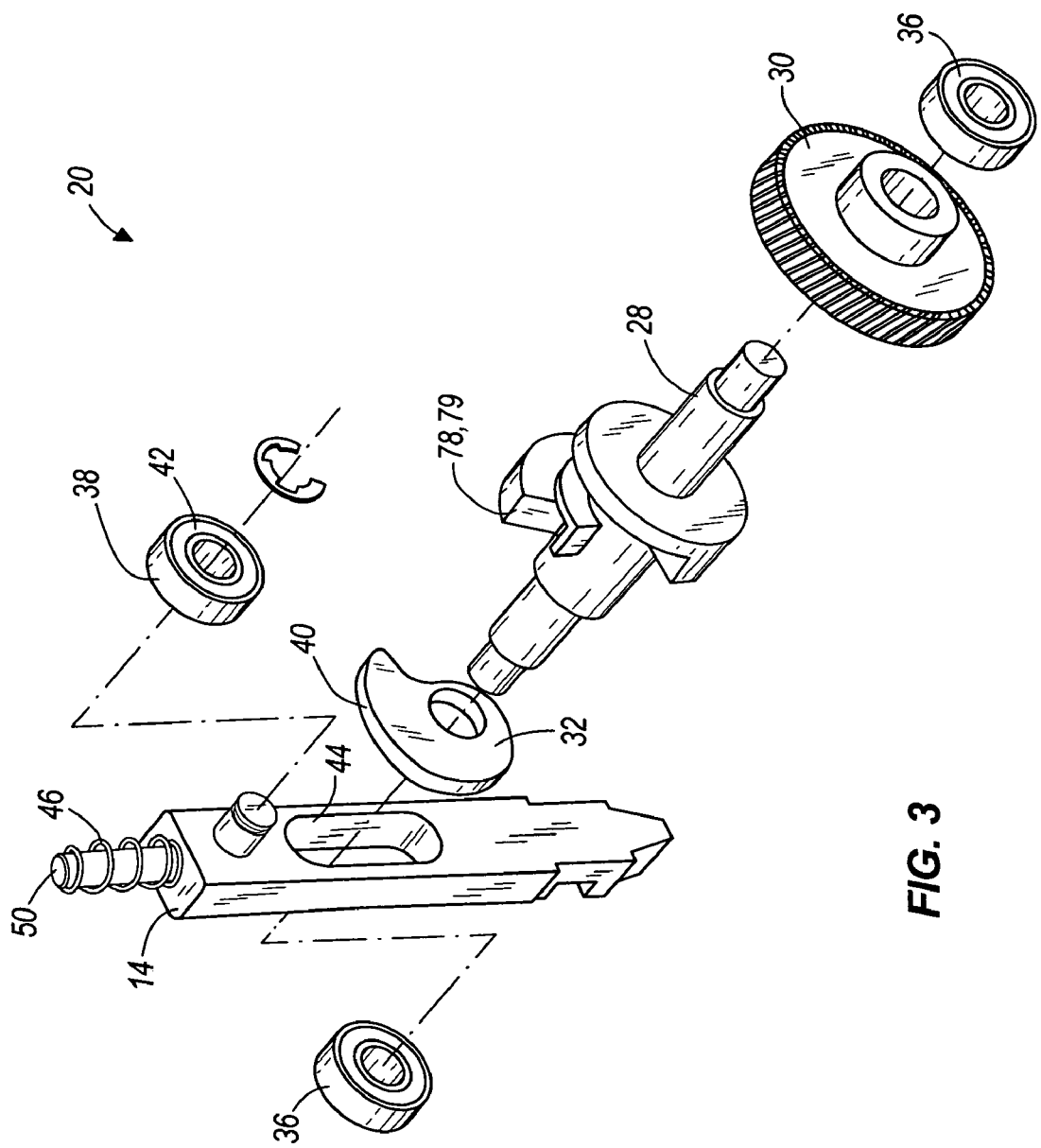
FIG. 3 is an exploded perspective view of a portion of the steering column lock assembly illustrated in FIG. 1.

With reference first to FIGS. 1–3 which show an exemplary embodiment of the present invention, the lock apparatus 10 can have a frame 12 within which is received a lock bolt 14 that can be extended and retracted to lock and unlock a steering column (not shown), respectively. When extended, the lock bolt 14 can engage within teeth of a gear (also not shown) mounted on the steering column in a manner well known to those skilled in the art, thereby preventing the steering column from being rotated by a user or otherwise disabling or substantially disabling the steering column from use. Alternatively, the lock bolt 14 can extend into engagement within a groove, slot, recess, or other aperture in any element connected to the steering column or in the steering column itself. Like the lock bolt engagement with the gear teeth just described, the engaged lock bolt in such alternative embodiments operates to prevent steering column rotation.

The lock apparatus 10 can be mounted adjacent a steering column in any conventional manner, such as by conventional threaded fasteners passing through apertures in the lock apparatus frame 12, by one or more flanges of the frame 12 secured with respect to the steering column by bolts, screws, rivets, pins, posts, clips, or other conventional fasteners, by welding, brazing, or adhesive or cohesive bonding material, by inter-engaging elements, and the like. Furthermore, the lock apparatus 10 can be mounted to any structure (e.g., a portion of the vehicle frame, elements or structure near or surrounding the steering column, and the like) suitable to position the lock apparatus 10 adjacent the steering column. The various manners in which steering column locks can be secured within a vehicle are well known to those skilled in the art and are not therefore described further herein. Any such manner can be employed in conjunction with the present invention.

The frame 12 can take any shape desired, limited only by the ability to mount other lock assembly components thereto as described in more detail below. The frame 12 can be a compact structure having a substantially flat face facing the steering column. In other embodiments, the lock apparatus 10 can be adapted to fit around at least a portion of a steering column. For example, the frame 12 can have one or more walls shaped to cup or otherwise fit around a steering column. The walls can partially or fully support the steering column, can guide the steering column in its rotation by a user, and/or can at least partially enclose the lock bolt 14 and the recess mating therewith.

The lock assembly 10 can further include an actuator 18 and a power transmission assembly 20 coupled to the lock bolt 14. As used herein and in the appended claims, when one element is said to be "coupled" to another, this does not necessarily mean that one element is fastened, secured, or otherwise attached to another element. Instead, the term "coupled" means that one element is either connected directly or indirectly to another element or is in mechanical or electrical communication with another element. Examples include directly securing one element to another (e.g., via welding, bolting, gluing, frictionally engaging, mating, etc.), elements which can act upon one another (e.g., via camming, pushing, or other interaction such as the illustrated relationship between the power transmission assembly 20 and the lock bolt 14 in the illustrated embodiment), one element imparting motion directly or through one or more other elements to another element, and one element electrically connected to another element either directly or through a third element.

The actuator 18 can be coupled to the frame 12 in any conventional manner. For example, the actuator 18 can be secured by one or more threaded fasteners or can be contained within an opening in the frame or housing 48. Alternatively, the actuator 18 can be secured by welds, by mating fasteners on the frame 12 and the actuator 18, and the like. Furthermore, the actuator 18 can be coupled directly to the frame or indirectly through a mounting bracket or other structure connected to the frame 12. The actuator 18 can be located substantially outside of the frame 12 or can be located partially or fully within the frame 12. In still other embodiments, the actuator 18 is not mounted to the frame, but is mounted to other structure and is drivably connected to the power transmission assembly 20 (see FIG. 3) in any suitable manner (e.g., by an elongated drive shaft, by a chain or cable, by one or more linkages, and the like).

In some embodiments, the actuator 18 is a conventional electric motor having an output shaft 24 as shown in FIGS. 1–3. The motor 18 can be a conventional reversible electric motor, but can be a non-reversible electric motor in other embodiments. As mentioned above, the motor 18 can be mounted to the frame 12 in any suitable manner. For example, to mount the motor 18 in the illustrated embodiment, the frame 12 can have a wall with an aperture 26 therein for receiving a portion of the output shaft 24 of the motor 18 and for correctly positioning the motor 18 with respect to the frame 12 and the power transmission assembly 20.

Some embodiments of the present invention employ a camming action between the power transmission assembly 20 and the lock bolt 14 for retracting the lock bolt 14. In such embodiments, the power transmission assembly 20 can be rotated in any suitable manner to generate this camming action. For example, the power transmission assembly 20 in the illustrated embodiment has a pivot 28 upon which a gear 30 and a cam 32 are located. In this embodiment, a worm gear 34 mounted upon the output shaft 24 of the motor 18 is turned by the motor 18 and thereby turns the gear 30 to turn the pivot 28 and cam 32. The worm 34 can be secured to the output shaft 24 of the motor 18 by a setscrew in a threaded aperture in the worm 34 or any other conventional manner, such as by being keyed thereon, by an interference fit, by a compression fit, by being threaded upon a threaded portion of the output shaft 24, by being integrally formed with the output shaft 24, and the like. Similarly, the gear 30 and/or the cam 32 can be secured upon the pivot 28 in any conventional manner such as those just mentioned with reference to the worm 34 on the output shaft 24.

The worm gear connection between the motor 18 and the power transmission assembly 20 define a speed reduction from the faster turning motor 18 and the slower turning power transmission assembly 20. It should be noted that this speed reduction can be produced in a number of different manners, such as by other gear assemblies (meshing spur gears of different sizes, planet and sun gears, etc.), belt and pulley or chain and sprocket assemblies, and the like. However, a worm 34 and worm gear 30 can provide advantages in some applications due to their relatively compact size, simple operation, and ease of assembly.

Also, the manner in which the motor 18 is drivably connected to the power transmission assembly 20 can be significantly different than that shown in the figures and described above. For example, the motor 18 can be mounted at an end of the power transmission assembly 20 (e.g., connected to the end of the pivot 28 in any conventional manner), can be mounted parallel to the power transmission assembly 20 to drive the power transmission assembly 20 by a set of spur gears, and the like.

The electric motor 18 of the above-described lock assembly 10 is only one type of actuator that can be employed in the lock apparatus 10 of the present invention. Other types of actuators 18 include without limitation conventional stepper motors, solenoids, hydraulic or pneumatic cylinders, and the like. Different types of actuators can be used to connect and drive the power transmission assembly 20 in different manners. By way of example only, the actuator 18 can be solenoid or cylinder that has an armature or piston, respectively, that can be extended and retracted. The armature or piston can drive a gear 30 on the pivot 28 by teeth, apertures, or ribs on the armature or piston (or on an element connected thereto) in a manner similar to a rack and pinion assembly. As another example, a motor can be coupled directly to the pivot 28 as described above, in which case the motor can be a relatively low-speed motor, if desired. Still other manners of turning the power transmission assembly 20 are possible, are well known to those skilled in the art, and fall within the spirit and scope of the present invention.

Some embodiments of the present invention employ speed reduction elements or assemblies between the actuator 18 and the power transmission assembly 20 as described above. Speed reduction can be used to increase the torque upon the power transmission assembly 20, thereby increasing the camming force exertable by the cam 32. In this manner, relatively high lock bolt extraction forces can be generated by the lock apparatus 10 without employing a large and powerful actuator 18. Some embodiments can employ different actuators and thereby potentially eliminate the need for speed reduction elements or assemblies of the lock apparatus 10.

The pivot 28 of the power transmission assembly 20 can be rotatably mounted to the frame 12 at its opposite ends as shown in the figures. However, the pivot 28 can also or instead be rotatably mounted at any number of locations along its length. For example, the pivot 28 can be mounted at a single location between the ends of the pivot 28, can be cantilevered from an end thereof, and the like. In some embodiments, the pivot 28 is mounted to the frame 12 by bearings 36. The bearings 36 can be of any conventional type, including without limitation sleeve bearings, ball bearings, journal bearings, a collar or sleeve of low-friction material such as nylon, plastic, Teflon® (DuPont, Inc.) or UHMW (Ultra-High Molecular Weight) material, and the like. In other embodiments, the pivot 28 can be received in clips, bosses, or other structures with a fit permitting rotation of the pivot 28. In still other embodiments, the pivot 28 can be pivotably received in one or more apertures in walls or other elements of the frame 12. Still other manners of pivotably supporting the pivot 28 on the frame 12 with or without bearings 36 are possible fall within the spirit and scope of the present invention.

As described above, the cam 32 can rotate to move the lock bolt 14 toward a retracted position. Specifically, in some embodiments of the present invention, the lock bolt 14 has a follower surface 38 which rides upon a cam surface 40 of the cam 32. The follower surface 38 can be defined by a number of different portions of the lock bolt 14 adjacent to the cam 32 or by a number of different elements connected to the lock bolt 14. In the illustrated embodiment for example, the lock bolt 14 has a pin projecting from it with a bearing attached to define a follower 42 having the follower surface 38. Depending upon the element or structure defining the follower 42, the follower 42 can be integral with the lock bolt 14 or attached thereto in any conventional manner (e.g., a finger, boss, or other portion of the lock bolt 14, a peg or post attached to the lock bolt 14, and the like).

The lock bolt 14 can take any shape desired, and in some embodiments has a generally elongated shape such as that shown in the figures. The lock bolt 14 can be one element as shown in the figures or can be a number of elements connected together in any conventional manner. For example, the portion of the lock bolt 14 that engages with the steering column or element connected thereto can be made of a relatively high-strength material such as steel or aluminum while the remainder of the lock bolt 14 can be made of plastic or other lower-cost material in order to reduce the cost and/or weight of the lock assembly 10.

In the illustrated embodiment, the lock bolt 14 is located adjacent the cam 32. This arrangement transmits forces that are substantially aligned along the lock bolt 14 (forces that are most effective in extracting the lock bolt 14 if bound). This arrangement can also reduce torque forces upon the lock bolt 14 resulting from camming action between the lock bolt 14 and the cam 32 and can provide a more compact lock assembly 10. In some embodiments, the lock bolt 14 can be located immediately beside the cam 32 as shown in the figures, although the elongated portion of the lock bolt 14 can be disposed from the cam 32 in other embodiments, if desired.

With particular reference to FIGS. 3, 5A–D, and 7A–D, the lock bolt 14 in some embodiments has an aperture 44 therethrough in which the pivot 28 is received. If employed, the aperture 44 can extend partially through the lock bolt 14 (such as where the pivot 28 is cantilevered as described above) or fully through the lock bolt 14 as shown in the figures. The aperture 44 can take any shape and size, but is sufficiently large to permit the lock bolt 14 to move with respect to the pivot 28. In the illustrated embodiment for example, the aperture 44 is elongated. By locating the lock bolt 14 so that the pivot 28 is partially or fully received therein, the resulting lock assembly structure can be relatively compact, with forces efficiently and effectively transmitted to the lock bolt 14 as described above. However, the lock bolt 14 in other embodiments can be located close to the cam 32 without receiving any part or all of the pivot 28. For example, the lock bolt 14 can be located to a side of the cam 32 and can have a foot extending over the cam 32 for actuation thereby. As another example in which a cantilevered pivot 28 is employed, the cantilevered end of the pivot 28 can end in the cam 32 rather than extend into the lock bolt 14.

The cam 32 can have a curved cam surface 40 of varying distance from the axis of rotation of the cam 32 and pivot 28. Such a surface can help to provide smooth operation of the lock assembly 10 and can produce good lock bolt extraction results. A number of cam shapes provide a curved camming surface 40 of varying distance from the axis of rotation of the cam 32 and pivot 28. The follower surface 38 of the lock bolt 14 can ride upon a side portion or camming surface 40 of the cam 32.

Figure 4:
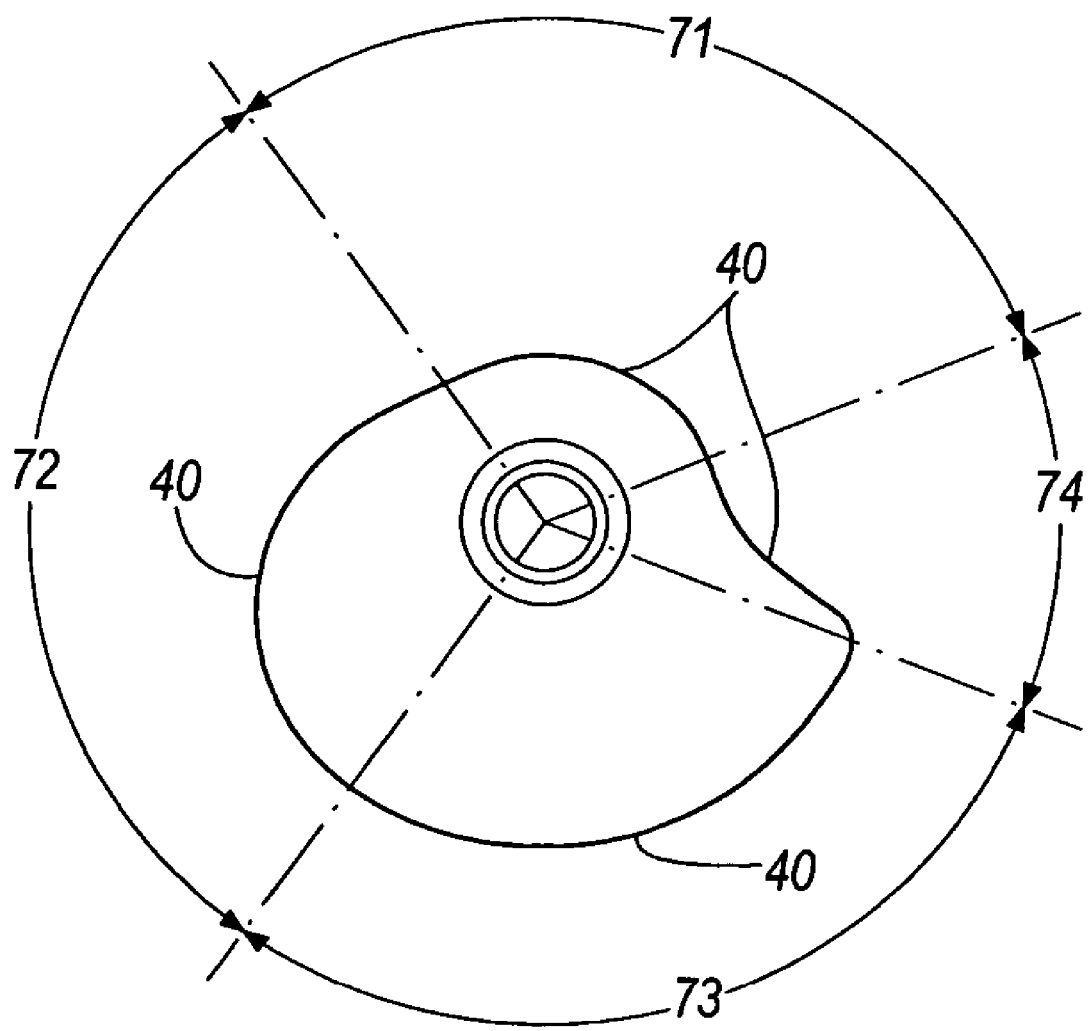
FIG. 4 is an end view of the cam illustrated in FIGS. 1–3.
Figure 5A:
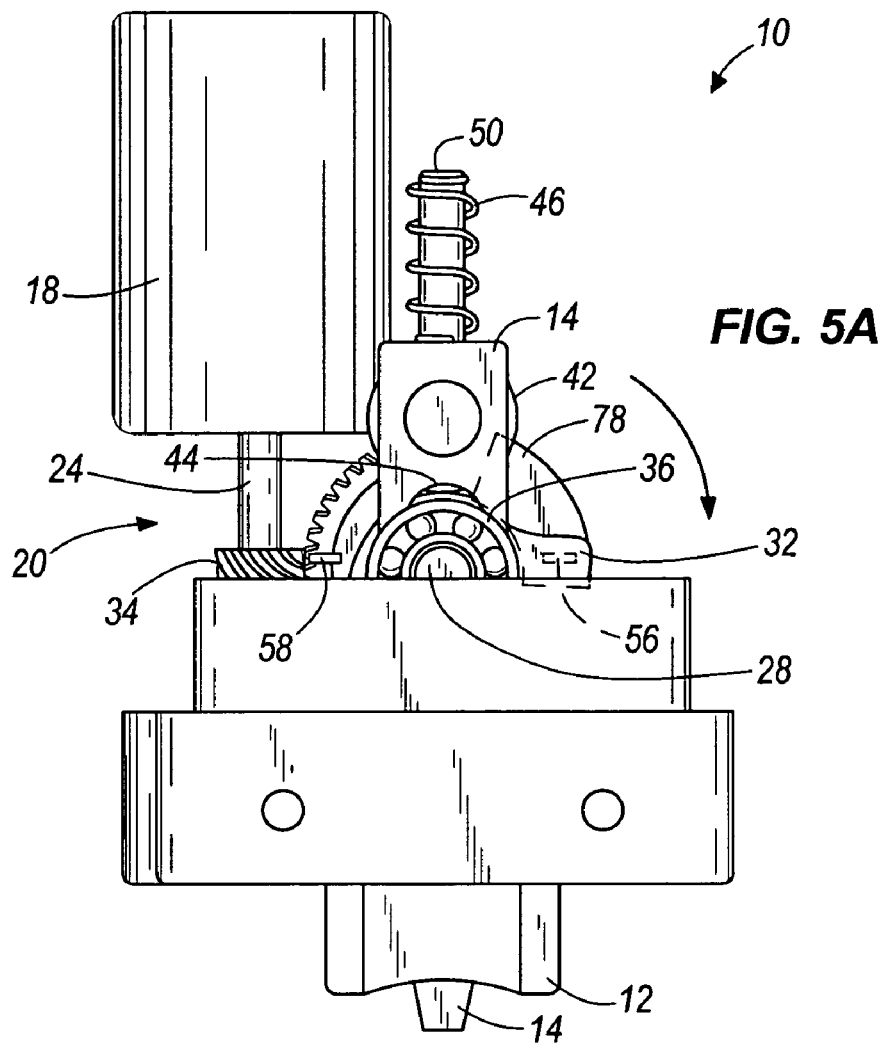
FIG. 5A is an end view of the lock assembly illustrated in FIG. 1, shown with the lock in a locked state.
Figure 6A:
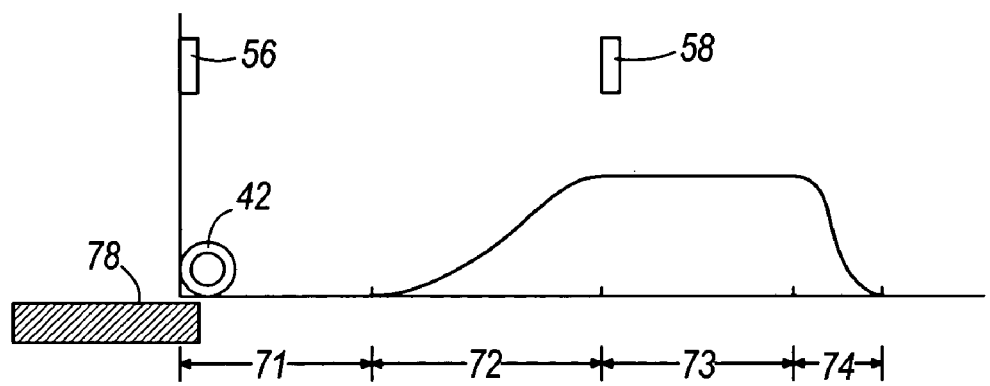
FIG. 6A is a displacement diagram of the cam and follower of the embodiment illustrated in FIGS. 5A–5D, shown with the follower in the position illustrated in FIG. 5A along with the relative positions of the magnet and the sensors.
Figure 5B:
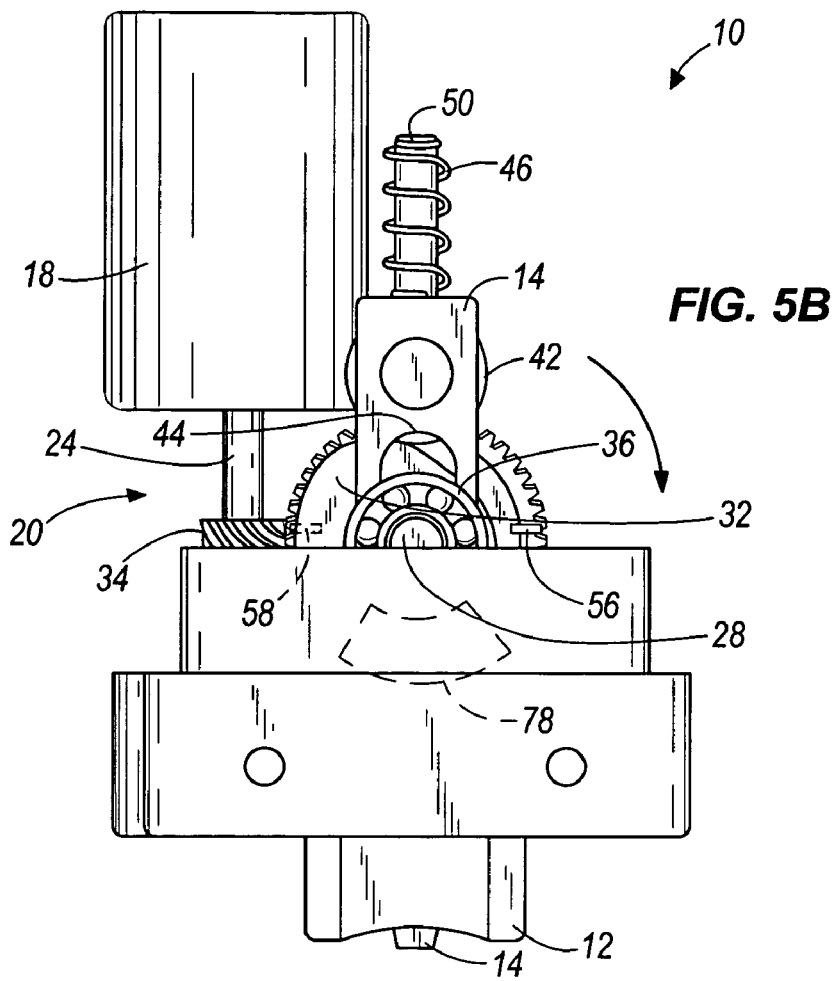
FIG. 5B is a partial cross-sectional end view of the lock assembly illustrated in FIG. 1, shown with the lock transitioning from the locked state to an unlocked state.
Figure 6B:
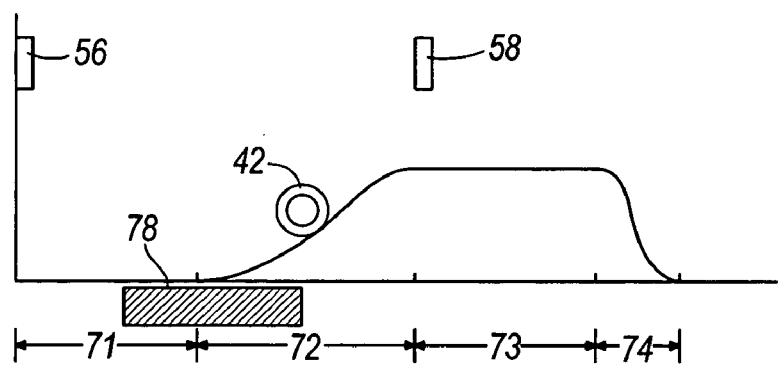
FIG. 6B is a displacement diagram of the cam and follower of the embodiment illustrated in FIGS. 5A–5D, shown with the follower in the position illustrated in FIG. 5B along with the relative positions of the magnet and the sensors.
Figure 5C:
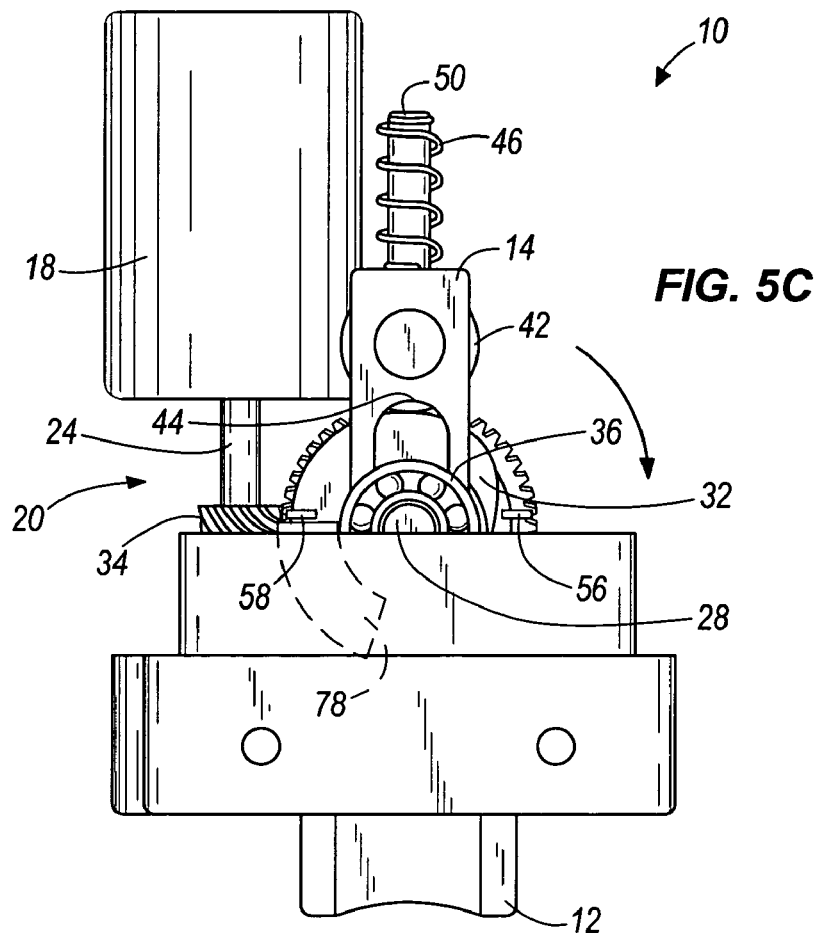
FIG. 5C is a partial cross-sectional end view of the lock assembly illustrated in FIG. 1, shown with the lock in the unlocked state.
Figure 6C:
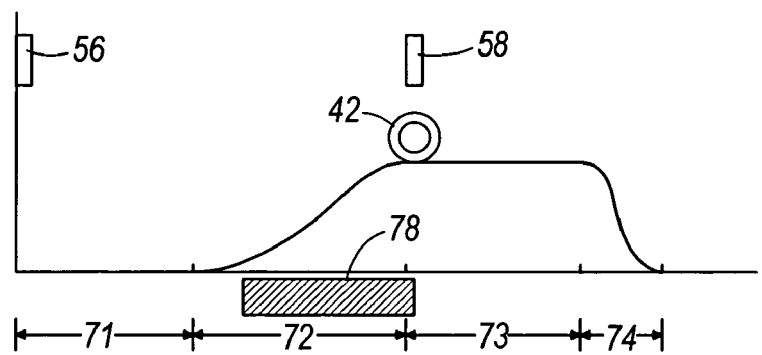
FIG. 6C is a displacement diagram of the cam and follower of the embodiment illustrated in FIGS. 5A–5D, shown with the follower in the position illustrated in FIG. 5C along with the relative positions of the magnet and the sensors.
Figure 5D:
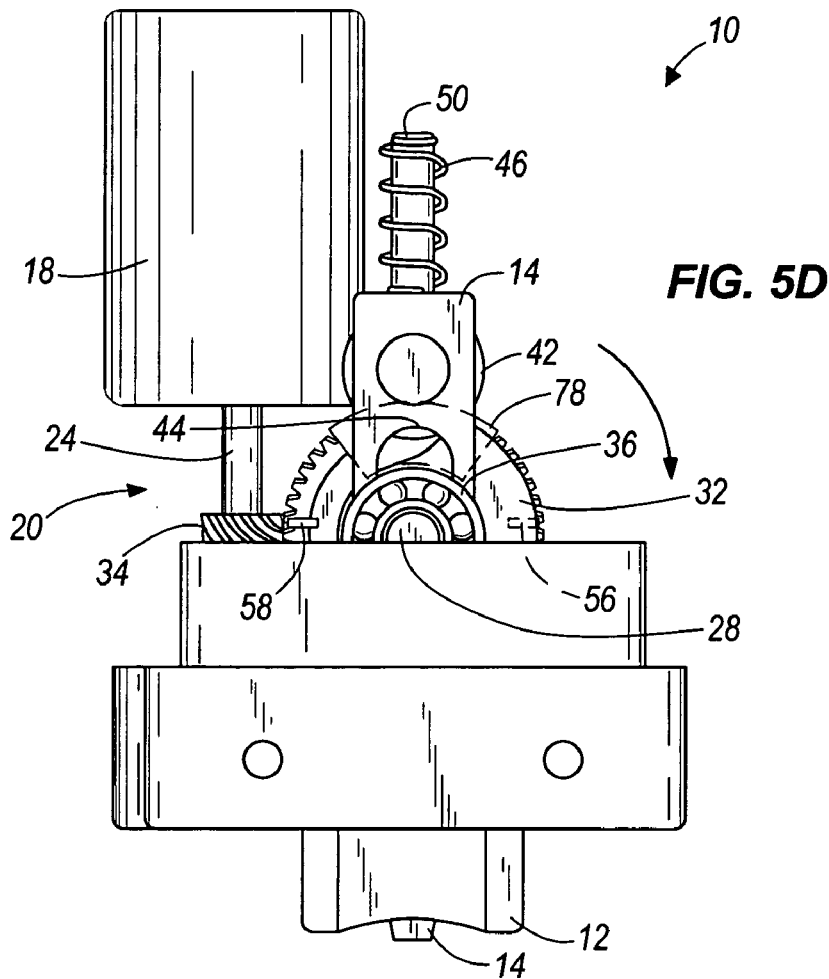
FIG. 5D is a partial cross-sectional end view of the lock assembly illustrated in FIG. 1, shown with the lock transitioning from the unlocked state to the locked state.
Figure 6D:
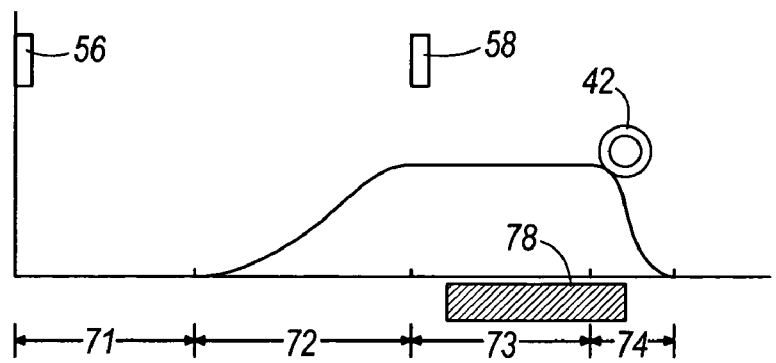
FIG. 6D is a displacement diagram of the cam and follower of the embodiment illustrated in FIGS. 5A–5D, shown with the follower in the position illustrated in FIG. 5D along with the relative positions of the magnet and the sensors.

In some embodiments, the curved surface of the cam 32 is divided into at least three sectors 71, 72, 73 (see, for example, FIG. 4). Each sector has a peripheral portion 40 having a profile that engages the follower 42 as the cam 32 rotates to move the lock bolt 14. The first sector 71 corresponds to the extended and locked position of the lock bolt 14, while the third sector 73 corresponds to the retracted and unlocked position of the lock bolt 14. The second sector 72 extends between the first sector 71 and the third sector 73.

As illustrated, the first sector 71 can have a substantially constant radial profile with respect to the pivot 28. This profile can provide a stable rest position for the follower 42 upon the cam 32 while the cam 32 is in the locked position because it can prevent the bias force upon the follower 42 from driving the cam 32 out of position. Other shapes can also provide a relatively stable locked position. For example, part or all of the profile of the first sector 71 can have a substantially concave shape. With such a profile, even if the bias force upon the follower 42 were able to drive the cam 32, the cam 32 would likely rotate to position the follower 42 within the concave portion, thereby retaining the cam 32 in a rotational position corresponding to the locked position of the lock bolt 14.

Although the profiles discussed above are substantially stable (i.e., resulting in a cam 32 that is less likely to rotate under force from the follower 42), the first sector 71 can have other profiles as desired. For example, at least a portion of the first sector 71 can have a convex shape, or can have a profile with a varying radial distance with respect to the pivot 28. In those cases where some relatively low level of resistance to pivot rotation is needed, the engagement between the power transmission assembly 20 and the actuator 18 can prevent the cam 32 from rotating, such as due to forces placed upon the cam 32 by the follower 42. In the illustrated embodiment for example, the engagement between the worm 34 and the gear 30 can prevent the cam 32 from being driven by the follower 42.

As described above, the first sector 71 corresponds to the locked position of the lock bolt 14. Therefore, the follower 42 should not be displaced a substantial amount due to rotation of the cam 32 while the follower 42 is contacting at least a portion of the periphery of the first sector 71 (a motion that would otherwise move the lock bolt 14 away from an extended and locked state).

In some embodiments, it is necessary to provide a sufficiently large camming surface of the first sector 71 in order for the cam 32 to decelerate and stop at a locked position of the lock bolt 14. The size of this camming surface can depend at least in part upon the speed at which the cam 32 rotates. In many applications, the cam 32 rotates up to 750 RPM (for example) in order to quickly change the state of the lock assembly 10, although faster and slower speeds are possible. The inertia of the elements being rotated (e.g., the power transmission assembly 20 and actuator 18 in the illustrated embodiment) can be substantial when the follower 42 enters the first sector 71. Thus, the size of the sector 71 should be sufficient to allow the rotation of the cam 32 to stop while the follower 42 is within the first sector 71. Therefore, in some embodiments, this sector 71 is selected to be greater than about 30 degrees. Also, in some embodiments this sector 71 is selected to be less than about 150 degrees. However, a sector 71 between about 60 and about 120 degrees can provide better performance results. Also, a sector 71 of between about 110 and about 120 degrees can provide still better performance results.

The cam 32 can also have a sector corresponding to the retracted and unlocked position of the lock bolt 14. For purposes of description, this sector is referred to herein as the third sector 73. As illustrated, the third sector 73 can have a substantially constant radial profile with respect to the pivot 28, and has a different radial size than the first sector 71. This profile can provide a stable rest position for the follower 42 upon the cam 32 while the cam 32 is in the unlocked position because it can prevent the bias force upon follower 42 from driving the cam 32 out of position. Other shapes can also provide a relatively stable unlocked position. For example, part or all of the profile of this sector 73 can have a substantially concave shape. With such a profile, even if the bias force upon the follower 42 were able to drive the cam 32, the cam 32 would likely rotate to position the follower 42 within the concave portion, thereby retaining the cam 32 in a rotational position corresponding to the unlocked position of the lock bolt 14.

Although the profiles of the third sector 73 discussed above are substantially stable (i.e., resulting in a cam 32 that is less likely to rotate under force from the follower 42), the third sector 73 can have other profiles as desired. For example, at least a portion of the third sector 73 can have a convex shape or can have a profile with a varying radial distance with respect to the pivot 28. As mentioned above, in those cases where some relatively low level of resistance to pivot rotation is needed, the engagement between the power transmission assembly 20 and the actuator 18 can prevent the cam 32 from rotating (such as due to forces placed upon the cam 32 by the follower 42). In the illustrated embodiment for example, the engagement between the worm 34 and the gear 30 can prevent the cam 32 from being driven by the follower 42.

As described above, the third sector 73 corresponds to the unlocked position of the lock bolt 14. Therefore, the follower 42 should not be displaced a substantial amount due to rotation of the cam 32 while the follower 42 is contacting at least a portion of the periphery of the third sector 73 (a motion that could otherwise permit the lock bolt 14 to move toward an extended and locked state).

In some embodiments, it is necessary to provide a sufficiently large camming surface of the third sector 73 in order for the cam 32 to decelerate and stop at an unlocked position of the lock bolt 14. As with the first sector 71 described above, the size of this camming surface can depend at least in part upon the speed at which the cam 32 rotates (in many applications, the cam 32 rotates relatively fast to quickly change the state of the lock assembly 10) and the inertia of the elements being rotated (the power transmission assembly 20 and actuator 18 in the illustrated embodiment can have substantial inertia when the follower 42 enters the third sector 73). Thus, the size of the sector 71 should be sufficient to allow the rotation of the cam 32 to stop while the follower 42 is within the third sector 73. Therefore, in some embodiments, this sector 73 is selected to be greater than about 30 degrees. Also, in some embodiments this sector 73 is selected to be less than about 150 degrees. However, a sector 73 of between about 60 and about 120 degrees can provide better performance results. Also, a sector 73 of between about 110 and about 120 degrees can provide still better performance results.

The cam 32 can also have a sector that extends between the first sector 71 and the third sector 73. For purposes of description, this sector is referred to herein as the second sector 72. As illustrated, the second sector 72 can have a ramped surface extending between the end of the first sector 71 to the beginning of the third sector 73 and having a camming surface increasing in radial distance toward the third sector 73. In some embodiments, this surface can ramp gradually between the first sector 71 and the third sector 73 to provide a high degree of mechanical advantage for the actuator 18 to drive the cam 32. Such mechanical advantage can be useful at the beginning stage of lock bolt retraction where the lock bolt 14 may be bound and therefore resistant to retraction, and can be produced in some embodiments by having the ramped portion extend over a substantial circumferential portion of the cam 32. In some cases, it can be advantageous to extend this sector 72 over a substantial portion of the cam 32 to provide as gradual of a ramp as possible. For example, in the illustrated embodiment, this second sector 72 is between about 110 and 120 degrees. In other embodiments, however, this sector 72 is smaller or larger depending at least in part upon the circumferential portion of the cam 32 available for the second sector 72, extraction requirements, and the like. In some embodiments, this sector 72 is selected to be greater than about 30 degrees. Also, in some embodiments this sector 72 is selected to be less than about 270 degrees. However, a sector 72 of between about 60 and about 180 degrees can provide better performance results. Also, a sector 72 of between about 110 and about 120 degrees can provide still better performance results.

In some embodiments, a relatively high degree of mechanical advantage can be achieved by making the second sector 72 as large as or larger than all other sectors of the cam 32. Thus, if the cam 32 only has three sectors 71, 72, 73 (such as in the illustrated exemplary embodiment), then a high degree of mechanical advantage can be achieved by having the second sector 72 be at least about 120 degrees.

It will be appreciated by one having ordinary skill in the art that a number of different cam shapes can provide the various sectors 71, 72, 73 described above, each cam shape being somewhat different in overall shape than the others while still falling within the spirit and scope of the present invention. For example, some embodiments can have transitions between sectors to provide relatively smooth motion of the follower 42 with minimal shocking or jarring impacts as the follower rides upon the cam 32. As another example, additional sectors can exist on cams according to other embodiments of the present invention. Particularly, some embodiments may have a fourth sector 74 extending between the third sector 73 and the first sector 71.

With reference to the embodiment of FIGS. 1–6D for example, the illustrated cam 32 has a fourth sector 74 providing a ramped surface between the third and first sectors 73, 71. The peripheral surface of the cam 32 in this fourth sector has a decreasing radial dimension approaching the first sector 71. Although the fourth sector 74 is not required for operation of the lock assembly 10, it can be used in some embodiments to prevent shock to the follower 42 as the follower 42 transitions from the third sector 73 to the first sector 71 (or vice versa). In some embodiments, the fourth sector 74 exists, but is significantly smaller than the other sectors 71, 72, 73 (in some cases even defined by a nearly radial surface of the cam 32 extending between the first and third sectors 71, 73). Also, in some embodiments, the difference in follower displacement between the third sector 73 and the first sector 71 is equal to displacement necessary to retract the bolt 14 from the locked state. Therefore, an abrupt change from the third sector 73 to the first sector 71 can result in undesirable forces upon the follower 42, noise, assembly vibration, and/or assembly shock. It will be appreciated that a fourth sector 74 can be advantageously employed on cams 32 that are rotated in only one direction in normal operation. However, cams 32 having a fourth sector 74 as just described can be employed regardless of whether the cams 32 are driven in one or both directions.

With continued reference to the illustrated exemplary embodiment of FIGS. 1–6D, the first sector 71 of the illustrated cam 32 has a radius that is less than the third sector 73. However, this arrangement can be reversed, if desired, thereby resulting in a configuration in which the first sector 71 corresponds to the unlocked state of the lock assembly 10, while the third sector 73 corresponds to the locked state of the lock assembly 10.

In the illustrated embodiment, the follower 42 is biased towards the cam 32 to place the lock bolt 14 into the locked and extend position when the cam 32 is rotated to place the lock bolt 14 in contact with the first sector 71. Due to this configuration, the cam 32 is used to drive the follower 42 against bias force upon the lock bolt 14 in order to extract the lock bolt 14. However, in some embodiments, the cam 32 and lock bolt 14 can be arranged so that the cam 32 is used to drive the follower 42 into an extended and locked state. For example, the positions of the follower 42 and cam 32 can be reversed in the illustrated embodiment of FIGS. 1–6D such that rotation of the cam 32 pushes the lock bolt 14 toward its extended and locked position, while further rotation of the cam 32 permits the lock bolt 14 to be retracted to its unlocked position. In such embodiments, the lock bolt 14 can be biased into a retracted and unlocked state by a biasing element.

The shape of the cam 32 can be at least partially dependent upon whether the actuator 18 is reversible. In other words, if the actuator 18 rotates the power transmission assembly 20 a particular amount in one direction to extend the lock bolt 14 and an amount in an opposite direction to retract the lock bolt 14, the camming surface 40 may be only a portion of the cam's peripheral surface. In such cases, the remainder of the cam 32 can take any shape desired, as it is largely unimportant to the functions of the cam 32 described herein. However, in those cases where the actuator 18 rotates in only one direction to both extend and retract the lock bolt 14, the cam 32 can have one or more surfaces which cam against the follower 42 to permit extension of the lock bolt 14 and a number of surfaces which retract the lock bolt 14 spaced about the periphery of the cam 32. Some embodiments provide a relatively large mechanical advantage for bolt retraction by using the majority of the cam 32 surface (or at least as much of the cam surface as possible) to move the lock bolt 14 from a locked state to an unlocked state.

In the illustrated exemplary embodiment, the cam 32 and follower 42 described above are employed to move the lock bolt 14. In other embodiments however, rotation of the power transmission assembly 20 can generate the same or similar movement of the lock bolt 14 in other manners. By way of example only, the pivot 28 can instead have a finger, post, arm, or other extension located at a radial distance from the pivot 28 and rotatable by the pivot 28 through an arc to retract the lock bolt 14. Such other manners of transforming rotational motion of the power transmission assembly 20 into linear or substantially linear motion of the lock bolt 14 are well known to those skilled in the art and fall within the spirit and scope of the present invention.

In order to move the lock bolt 14 from a retracted and unlocked position to an extended and locked position, some embodiments of the lock assembly 10 include a spring 46 mounted to exert biasing force against the lock bolt 14. The spring 46 can be a coil spring compressed between the lock bolt 14 and a cover 48 of the lock assembly 10 as shown in the figures. However, this and any other type of conventional spring can be positioned in a number of other manners still performing the function of biasing the lock bolt 14 toward its extended position. For example, an extension spring can be connected to the lock bolt 14 and to the frame 12 to bias the lock bolt 14 to an extended position, a torsion spring can be coupled to the pivot 28 to bias the pivot 28 (and therefore the power transmission assembly 20) toward a rotational position in which the lock bolt 14 is in an extended position, a leaf spring can be mounted to the underside of the cover 48 to bias the lock bolt 14 away therefrom when the cover 48 is installed upon the frame 12, and the like. Still other manners of biasing the lock bolt 14 as just described include, without limitation, one or more magnets or magnet sets exerting repelling and/or attractive forces upon the lock bolt 14, an air spring positioned to bias the lock bolt 14, an electromagnetic actuator connected to the lock bolt 14, and the like. As used herein and in the appended claims, the term "spring" therefore refers to any element capable of exerting a biasing force to bias the lock bolt 14 as described above.

In order to retain the spring 46 in place in the lock assembly 10, a spring retainer 50 can extend from the lock bolt 14, cover 48, or frame 12 (depending at least in part upon the location of the spring 46). Alternatively, the spring 46 can be attached to the lock bolt 14, cover 48, or frame 12 in any conventional manner, such as by one or more screws, rivets, bolts, or other fasteners, by one or more welds, by adhesive or cohesive bonding material, and the like.

Some embodiments of the present invention employ a cover 48 to at least partially enclose the power transmission assembly 20 and/or the actuator 18. The cover 48 can be any shape and size, and can function to protect the lock components on the frame 12 from dirt, debris, contaminants, and exposure to the surrounding environment. The cover 48 can be attached to the frame 12 in any suitable manner, such as by one or more snap fits, by mating pins and apertures, by clips, clasps, clamps, buckles, or other conventional securing devices, by one or more conventional fasteners (e.g., screws 52 or bolts passed into or through apertures 54 in the frame 12), and the like.

The actuator 18 of the present invention can be triggered to perform locking and/or unlocking operations in a number of different manners. In the illustrated exemplary embodiment, the electric motor 18 is electrically connected to a vehicle security controller (not shown). When a locking or unlocking operation is desired, the controller activates the motor 18 to begin turning and to thereby move the lock bolt 14. When the lock bolt 14 has reached a desired locked or unlocked position, the electric motor 18 can be deactivated in a number of different manners.

In some embodiments, one or more sensors are located adjacent the power transmission assembly 20 (e.g., adjacent the cam 32, pivot 28, or gear 30) or adjacent the lock bolt 14 to directly or indirectly detect the position of the lock bolt 14. For example, in some embodiments, the sensor(s) can be positioned to detect when the lock bolt 14 reaches desired extended and retracted positions. In other embodiments, however, the sensors can be positioned to detect when the bolt is at any location in its range of travel.

Some embodiments employing two or more sensors for deactivating the actuator 18 can have one sensor 56 tripped when the cam 32 rotates to (or sufficiently toward) a position corresponding to an extended position of the lock bolt 14, and have another sensor 58 tripped when the cam 32 rotates to (or sufficiently toward) a position corresponding to a retracted position of the lock bolt 14. Upon being tripped, the sensors 56, 58 can directly or indirectly deactivate the actuator 18 to stop rotation of the power transmission assembly 20.

With reference to the illustrated exemplary embodiment of FIGS. 1–6D, two sensors 56, 58 are employed to deactivate the actuator 18 as described above (i.e., one sensor 56 being tripped when the cam 32 rotates to or sufficiently toward a position corresponding to an extended position of the lock bolt 14, and another sensor 58 being tripped when the cam 32 rotates to or sufficiently toward another position corresponding to a retracted position of the lock bolt 14). As with the other embodiments of the present invention, the sensors 56, 58 can be mounted in a number of different manners to function as just described. By way of example only, the sensors 56, 58 can be mounted to the frame 12, to the cover 48, to another element coupled to the frame 12 or cover 48, or to any other structure providing a mounting surface for the sensors 56, 58 adjacent the element to be detected (e.g., the lock bolt 14, cam 32, pivot 28, gear 30, and the like). In the illustrated embodiment of FIGS. 1–6D, the sensors 56, 58 are mounted upon a circuit board 62 located within the lock assembly 10 and positioned adjacent the power transmission assembly 20. For ease of illustration, the sensors 56, 58 illustrated in FIGS. 5A–5D and 7A–7D are shown without the circuit board 62 to which they are attached.

Regardless of the number of sensors 56, 58 employed, any number of the sensors 56, 58 can be mounted to detect the rotational position of any element between the actuator 18 and the lock bolt 14, and in some cases can be mounted to detect the position of the lock bolt 14 by detecting a position of the actuator 18 (e.g., by detecting a rotational position of the output shaft 24 of an electric motor 18, a linear position of an armature of a solenoid, and the like).

In some embodiments, some sensors 56, 58 can be mechanically tripped by stops that extend from any of the elements being detected (e.g., radially from the pivot 28, laterally from the lock bolt 14, axially from a side of the gear 30, radially from the output shaft 24 of the motor 18, and the like). For example, two sensors 56, 58 can be mounted adjacent to the power transmission assembly 20 in the illustrated exemplary embodiment of FIGS. 1–6D and can be "tripped" as one or more portions of the power transmission assembly 20 rotate past the sensors 56, 58. In some cases, the sensors 56, 58 can detect the amount of movement of an element in any conventional manner to determine the position of the lock bolt 14, such as by counting the revolutions or amount of revolution of the pivot 28, gear 30, or motor output shaft 24, by counting spaced protrusions, recesses, or other features on the lock bolt 14, etc.

Each sensor 56, 58 can be electrically connected to the vehicle system controller or can be directly or indirectly connected to the actuator 18 to deactivate the actuator 18 when the sensor 56, 58 is tripped. For example, as discussed above, the sensors 56, 58 can be coupled to a circuit board 62 having a micro controller which can be coupled to the actuator 18 directly or via a vehicle control system.

The sensors 56, 68 can take any desired form. By way of example only, the sensors 56, 58 can be mechanically-tripped sensors positioned to detect any of the lock assembly elements described above. In some embodiments, such sensors 56, 68 can be positioned to contact the camming surface 40 of the cam 32, a raised portion on the cam 32 such as a stop in the form of a pin, post, ramp, block, flange, and the like extending from the cam 32, or any other feature of an element in the power transmission assembly 20, driving the power transmission assembly 20, or driven by the power transmission assembly 20.

Other manners of directly or indirectly detecting the position of the lock bolt 14 are possible by the use of other types of sensors 56, 58. For example, other sensor types include without limitation magnetic sensors for detecting one or more magnetic or ferrous elements on one or more moving lock assembly components, optical sensors for detecting the proximity of a moving lock assembly component or of the color or reflectivity of any portion of the moving lock assembly component, and the like. Still other sensor types can be used to directly or indirectly detect the position of the lock bolt 14. In addition, although two sensors 56, 58 are employed in some embodiments such as that shown in the figures, one having ordinary skill in the art will appreciate that the actuator 18 can be deactivated in the extended and retracted lock bolt positions by only one sensor positioned to detect any of the moving lock assembly components described above. For example, and with reference to the illustrated embodiment of FIGS. 1–6D, multiple stops can be located on the cam 32 to trip the same sensor in different rotational positions of the cam 32 corresponding to extended and retracted lock bolt positions. As another example, one sensor can be located adjacent the lock bolt 14 and can be tripped by two different stops on the lock bolt 14 corresponding to extended and retracted lock bolt positions. In other embodiments, three of more sensors can be employed to detect the position of one or more moving lock assembly components in any conventional manner such as those described above.

In some embodiments, the sensors 56, 58 can be non-contacting sensors, such as Hall effect sensors, infrared sensors, motion sensors, and the like. For example, the illustrated embodiment of FIGS. 1–6D employs two hall effect sensors 56, 58 positioned adjacent the power transmission assembly 20. Furthermore, a magnet 78 is coupled to the pivot 28 of the power transmission assembly 20. As the magnet 78 rotates with the pivot 28, it passes by the sensors 56, 58 to indicate the position of the pivot 28, (and therefore, the position of the lock bolt 14). Thus, the actuator 18 can be signaled to turn off once the bolt 14 reaches the locked or unlocked positions or as the lock bolt 14 approaches the locked or unlocked positions (such as in cases where the lock bolt 14 continues to move as the power transmission assembly 20 and/or the actuator 18 decelerates to a stop).

Although the magnet 78 is illustrated as being attached to the pivot 28 between the gear 30 and the cam 32, the magnet 78 can be mounted in a variety of positions. For example, the magnet 78 can be directly coupled to the cam 32, the gear 30, the bolt 14, and the like, and can be located at any position along the power transmission assembly 20 depending at least in part upon the location of the sensors 56, 58. In the illustrated embodiment of FIGS. 1–6D, the sensors 56, 58 are located on the circuit board 62, which is located within the frame 12 and cover 48 between the gear 30 and cam 32. Therefore, the magnet 78 is located adjacent the sensors 56, 58, and circuit board 62. The magnet 78 can instead be mounted in any other location in the lock assembly 10 adjacent the sensors 56, 58 (which can be mounted in any other location as described herein).

Although the various types of sensors 56, 58 described herein can each be mounted adjacent a moving component of the latch assembly 10 to directly or indirectly detect the position of the lock bolt 14, it will be appreciated that any of the sensors 56, 58 can instead be mounted on the moving latch assembly component for detecting adjacent structure (e.g., portions of the frame 12 or cover 48, other stationary elements coupled to the frame 12 or cover 48, and the like), thereby detecting the rotational position of the moving latch assembly component.

As discussed above, the illustrated exemplary embodiment of FIGS. 1–6D employs a magnet mounted on the power transmission assembly 20 adjacent the sensors 56, 58 to detect the rotational position of the cam 32. In some embodiments, the size and position of the magnet 78, as well as the position of the sensors 56, 58 can be selected based at least in part upon the shape of the cam 32 and whether the cam 32 rotates in two directions. FIGS. 6A–D illustrate a displacement diagram of the lock bolt 14 based upon an exemplary magnet 78 and sensor 56, 58 arrangement and using a cam 32 that rotates in an single direction only. As illustrated in FIGS. 4 and 5, the cam 32 has four sectors 71, 72, 73, 74 corresponding to the locked, unlocking (i.e., upwardly-ramped), unlocked, and locking (i.e., downwardly-ramped) positions discussed earlier. As illustrated, the locked portion 71 extends for about 100 degrees, the ramped portion 72 extends between the locked portion 71 and the unlocked portion 73 for about 120 degrees, the unlocked portion 73 extends for about 100 degrees, and the ramped portion 74 extends between the unlocked portion 73 and the locked portion 71 for about 40 degrees. As discussed earlier, the angular sizes of these portions can differ in other embodiments of the present invention.

In some embodiments, the magnet 78 can be about equal in length or shorter than the length of the first and third sectors 71, 73 (the sectors defining dwells 71, 73 on the cam 32). In other words, in some embodiments the magnet 78 extends circumferentially about the pivot 28 the same amount as either of the first and third sectors 71, 73. Thus, the magnet 78 in the illustrated embodiment of FIGS. 1–6D can extend for about 100 degrees due to the lengths of the first and third sectors 71, 73. As will be described in greater detail below, the magnet 78 can be positioned on the pivot 28 so that the leading edge of the magnet 78 passes the second sensor 58 just as the follower 42 reaches the third (unlocked) sector 73 of the cam 32, and so that the leading edge of the magnet 78 passes the first sensor 56 just as the follower 42 reaches the first (locked) sector 71 of the cam 32 (see FIGS. 5 and 6). In such embodiments, the sensors 56, 58 are positioned at the beginning of first and third sectors 71, 73 defining the dwells on the cam 32.

In some embodiments, (such as the embodiment illustrated in FIGS. 1–6D), the magnet 78 and first sensor 56 can be circumferentially positioned so that the first sensor 56 is substantially centered with respect to the magnet 78 when the follower 42 is substantially centered on the first sector 71. Also, in some embodiments, (such as the embodiment illustrated in FIGS. 1–6D), the magnet 78 and first sensor 56 can be circumferentially positioned so that the first sensor 56 begins to sense the magnet 78 when the follower 42 transitions to the first sector 71 in the rotational direction of the cam 32, or immediately before the follower 42 transitions to the first sector 71 in the rotational direction of the cam 32. Furthermore, the magnet 78 and first sensor 56 can be circumferentially positioned so that the first sensor 56 stops detecting the magnet 78 when the follower 42 transitions away from the first sector 71 in the rotational direction of the cam 32, or immediately before the follower 42 transitions away from the first sector 71 in the rotational direction of the cam 32. In both cases, a control system to which the first sensor 56 is electrically connected detects when the follower 42 has reached or is about to reach the first sector 71 in which the lock bolt 14 is free to enter a locked state.

As described herein, in some embodiments the magnet 78 and first sensor 56 are positioned so that the first sensor 56 begins to sense the magnet 78 when (or immediately before) the follower 42 transitions to the first sector 71, and stops detecting the magnet 78 when (or immediately before) the follower 42 transitions away from the first sector 71. In such embodiments, the magnet 78 can be similar in circumferential size to the first sector 71.

In some embodiments, (such as the embodiment illustrated in FIGS. 1–6D), the magnet 78 and second sensor 58 can be circumferentially positioned so that the second sensor 58 is substantially centered with respect to the magnet 78 when the follower 42 is substantially centered on the third sector 73. Also, in some embodiments, (such as the embodiment illustrated in FIGS. 1–6D), the magnet 78 and second sensor 58 can be circumferentially positioned so that the second sensor 58 begins to sense the magnet 78 when the follower 42 transitions to the third sector 73 in the rotational direction of the cam 32, or immediately before the follower 42 transitions to the third sector 73 in the rotational direction of the cam 32. Furthermore, the magnet 78 and second sensor 58 can be circumferentially positioned so that the second sensor 58 stops detecting the magnet 78 when the follower 42 transitions away from the third sector 73 in the rotational direction of the cam 32, or immediately before the follower 42 transitions away from the third sector 73 in the rotational direction of the cam 32. In both cases, a control system to which the second sensor 58 is electrically connected senses when the follower 42 has reached or is about to reach the third sector 73 in which the lock bolt 14 is in an unlocked state.

As described herein, in some embodiments the magnet 78 and second sensor 58 are positioned so that the second sensor 58 begins to sense the magnet 78 when (or immediately before) the follower 42 transitions to the third sector 73, and stops detecting the magnet 78 when (or immediately before) the follower 42 transitions away from the third sector 73. In such embodiments, the magnet 78 can be similar in circumferential size to the third sector 73.

As the cam 32 rotates to move the bolt 14 toward the unlocked position, the follower 42 rides upon the first sector 71, which does not displace the bolt 14, or does so an insignificant amount. As the follower 42 reaches the end of the first sector 71, the follower 42 begins to move along the gradual ramped surface of the third sector 73, thereby displacing the bolt 32. As the follower 42 reaches the end of the third sector 73, the leading end 79 of the magnet 78 is sensed by the second sensor 58. This indicates that the lock bolt 14 is in the retracted and unlocked position and causes one or more signals to be sent to a controller and/or to the actuator 18 to stop the cam 32 from rotating. In some embodiments, as will be discussed in greater detail below, the actuator 18 can be turned off, short circuited, or reversed to stop the cam 32 from rotating.

Although the sensors 56, 58 can be located anywhere with respect to one another and with respect to the axis of rotation of the power transmission assembly 20 while still performing the functions described herein, the positions of the sensors 56, 58 are most commonly determined at least in part by the shape of the cam 32 (and more particularly, by the size of the sectors 71, 72, 73, 74 as described herein). Accordingly, in some embodiments the sensors are positioned less than 180 degrees apart from one another. By way of example only, the sensors 56, 58 in the embodiment of FIGS. 1–6D are positioned about 140 degrees apart to correspond to the total size of the third and fourth sectors 73, 74 of the cam 32 (140 degrees in the illustrated exemplary embodiment). In other embodiments, other distances can separate the sensors 56, 58 from one another, such as in cases where the sizes of the various sectors 71, 72, 73, 74 are different as described herein. For example the sensors 56, 58 can be separated by any amount totaling the sizes of the third and fourth sectors 73, 74 or the first and second sectors 71, 72.

Since the cam 32 and the power transmission assembly 20 have inertia, it may take time for the cam 32 to stop rotating in the absence of a physical stop. Therefore, the periphery of the cam 32 corresponding to the third sector 73 of the cam 32 may need to be long enough to allow the cam 32 to stop rotating with the follower 42 in the unlocked position. In the illustrated exemplary embodiment, this sector 73 is around 100 degrees, although other sizes are possible as discussed in greater detail above. In those embodiments employing a magnet 78 that is similar in size to the third sector 73, the second sensor 58 can detect the magnet 78 while the actuator 18 is stopped and the lock bolt 14 is in the unlocked position. Therefore, if the sensor 58 detects the presence of the magnet 78, the control system will determine that the lock bolt 14 is in the unlocked state. If, however, the second sensor 58 does not detect the presence of the magnet 78, then the control system will determine that the cam 32 has turned too far and that the lock bolt 14 may not be in the unlocked state. Thus, the actuator 18 can cycle again to move the bolt 14 through the first two sectors 71, 72 again to reach the unlocked state. Although a magnet 78 that is substantially the same circumferential size as the third sector 73 enables the second sensor 58 to detect when the follower 42 may no longer be on the third sector 73 (thereby enabling the lock assembly 10 to cycle as needed), magnets 78 having larger or smaller sizes can instead be employed.

In some embodiments of the present invention, when the second sensor 58 described above no longer detects the presence of the magnet 78 as the cam 32 rotates (indicating that the cam 32 has rotated too far), one or more signals can be sent to cause the actuator 18 to reverse in direction until the second sensor 58 detects the presence of the magnet 78 again, in which case the actuator 18 can be stopped to bring the follower 42 to rest upon the third sector 73. Although a number of different electronic circuits and methods can be used to operate the actuator 18 as just described, in some embodiments an H-Bridge (described in greater detail below) can be employed for this purpose. Also, such reverse jogging can be employed to position the cam 32 in any rotational position desired, thereby stopping the follower 42 at any number of possible positions upon the cam 32.

To move the bolt 14 from the unlocked state to the locked state, the actuator 18 can be actuated to cause the cam 32 to continue rotating in the same direction. As such, the follower 42 can ride through the remainder of the third sector 73 without further displacement (or significant displacement) of the lock bolt 14. As the follower 42 rides through the fourth sector 74, the lock bolt 14 moves from the unlocked state to the locked state. In some embodiments such as that shown in FIGS. 1–6A, this transition occurs faster than the transition from the locked state to the unlocked state. As the leading edge 79 of the magnet 78 leaves the fourth sector 74 in the illustrated exemplary embodiment, it passes by the first sensor 56. This indicates that the lock bolt 14 is in the locked state and is capable of being biased into the locked position. Thus, a signal can be sent to stop the actuator 18. Again, the cam 32 and the power transmission assembly 20 may have some momentum. However, as long as the periphery of the cam 32 corresponding to the first sector 71 is sufficiently long, the cam 32 can stop with the follower 42 adjacent any portion of the cam surface within the first sector 71.

Although the magnet 78 and the sensors 56, 58 are illustrated in FIGS. 1–6D as having a particular relationship with respect to certain sectors of the cam 32, this arrangement is not required. The sensors 56, 58 and the magnet 78 can be rotated any common amount about the pivot 28 without changing the performance of the lock assembly 10 as described above. In contrast, the relationship between the sensors 56, 58 and the magnet 78 determine the time at which the sensors 56, 58 can detect the approaching magnet and trigger the actuator 18 to stop while the lock bolt 14 is in a desired position.

In some embodiments, the cam 32 and the power transmission assembly 20 are capable of rotating in two directions. FIGS. 7A–7D illustrate a lock assembly 10' operable in this manner, while FIGS. 8A–D illustrate a lock bolt displacement diagram with an exemplary magnet 78' and sensor 56', 58' arrangement and using a cam 32' that is driven in both rotational directions. The embodiment of FIGS. 8A–8D is similar in many respects to the embodiment illustrated in FIGS. 1–6D and described above. Accordingly, elements and features of the embodiment illustrated in FIGS. 7A–8D corresponding to those of the embodiment illustrated in FIGS. 1–6D are assigned the same reference numerals primed. With the exceptions and differences described below (and barring mutual inconsistencies between the embodiments of FIGS. 1–6D and FIGS. 7A–8D), reference is made to the description of the FIGS. 1–6D embodiment above for further details and alternatives of the embodiment illustrated in FIGS. 7A–8D.

In the exemplary embodiment illustrated in FIGS. 7A–8D, the cam 32' has four sectors 71', 72', 73', 74' corresponding to locked, locking/unlocking (i.e., ramped), unlocked, and transitional positions of the lock bolt 14'. As illustrated, the locked portion 71' extends for about 110 degrees, the ramped portion 72' extends between the locked portion 71' and the unlocked portion 73' for about 110 degrees, the unlocked portion 73' extends for about 110 degrees, and the ramped portion 74' extends between the unlocked portion 73' to the locked portion 71' for about 30 degrees. As discussed earlier, the angular sizes of these portions can differ in other embodiments of the present invention.

In some embodiments, the magnet 78' can be about equal in length or shorter than the length of the gradual ramped portion 72' of the cam 32'. In other words, in some embodiments the magnet 78' extends circumferentially about the pivot 28' the same amount as the second sector 72'. Thus, the illustrated magnet 78' in the illustrated embodiment of FIGS. 7A–8D can extend for about 110 degrees due to the length of the second sector 72'.

With continued reference to the illustrated exemplary embodiment of FIGS. 7A–8D, the sensors 56', 58' are positioned at respective mid-points of the first and third sectors 71', 73' (55 degrees away from the respective ends of the second sector 72' in the illustrated exemplary embodiment). This distance is half the length of the magnet 78' (i.e., half of 110 degrees). In some embodiments, such as for embodiments in which the cam 32' is driven in both rotational directions, this relationship enables the sensors 56', 58' to detect the approach of the magnet 78' from either direction while still providing sufficient stopping distance for the follower 42' upon the cam 32'. For example, as shown in FIGS. 8A–D, the first sensor 56' is located with respect to the magnet 78' to sense the magnet 78' just as the follower 42' enters the first sector 71' of the cam 32', regardless of the rotational direction of the cam 32'. In those embodiments having a 110 degree first sector 71', the first sensor 56' can therefore be located fifty-five degrees from the ends of the first sector 71'. Thus, if a magnet 78' sized as described above is used, the sensor 56' can determine that the follower 42' has entered the first sector 71' from either rotational direction once the magnet 78' is sensed. This relationship is generally the same for the second sensor 58' with respect to the third sector 73' of the cam 32'.

Figure 7A:
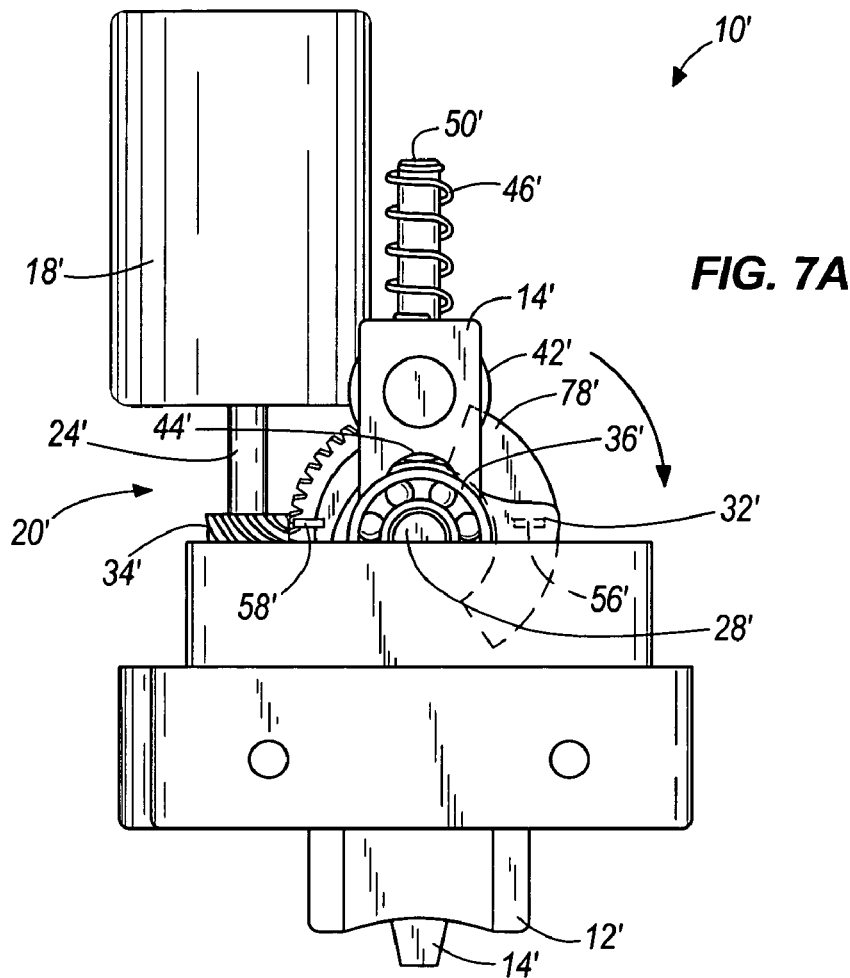
FIG. 7A is a partial cross-sectional end view of a lock assembly according to another exemplary embodiment of the present invention in which the cam is driven in two directions, shown with the lock in a locked state.
Figure 8A:
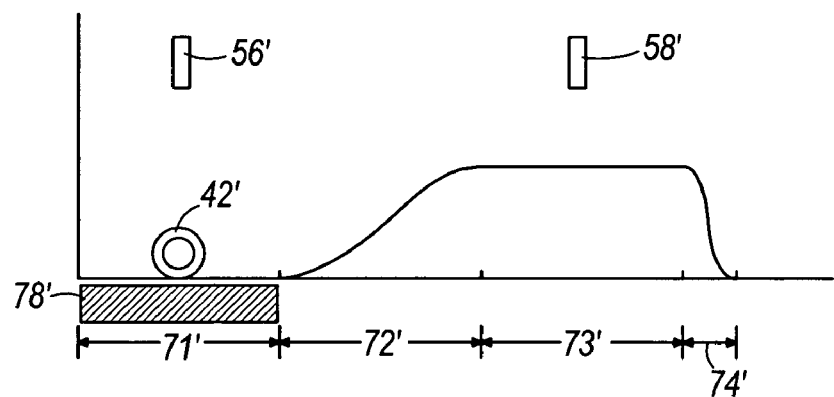
FIG. 8A is a displacement diagram of the cam and follower of the embodiment illustrated in FIGS. 7A–7D, shown with the follower in the position illustrated in FIG. 7A along with the relative positions of the magnet and the sensors.
Figure 7B:
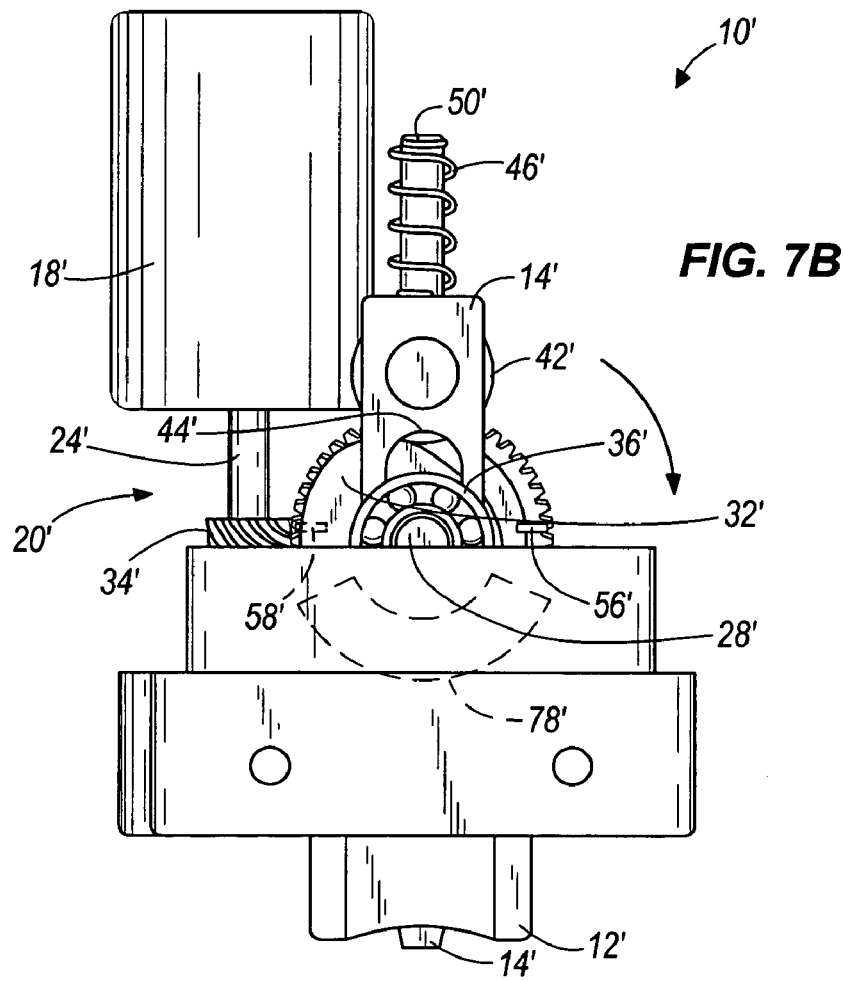
FIG. 7B is a partial cross-sectional end view of the lock assembly illustrated in FIG. 7A, shown with the lock transitioning from the locked state to an unlocked state.
Figure 8B:
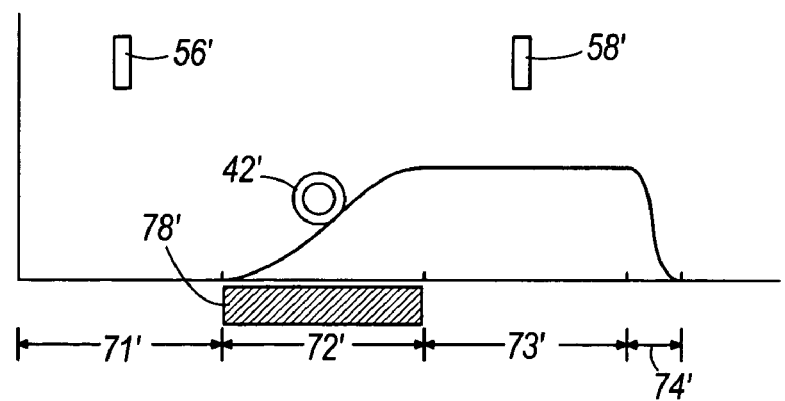
FIG. 8B is a displacement diagram of the cam and follower of the embodiment illustrated in FIGS. 7A–7D, shown with the follower in the position illustrated in FIG. 7B along with the relative positions of the magnet and the sensors.
Figure 7C:
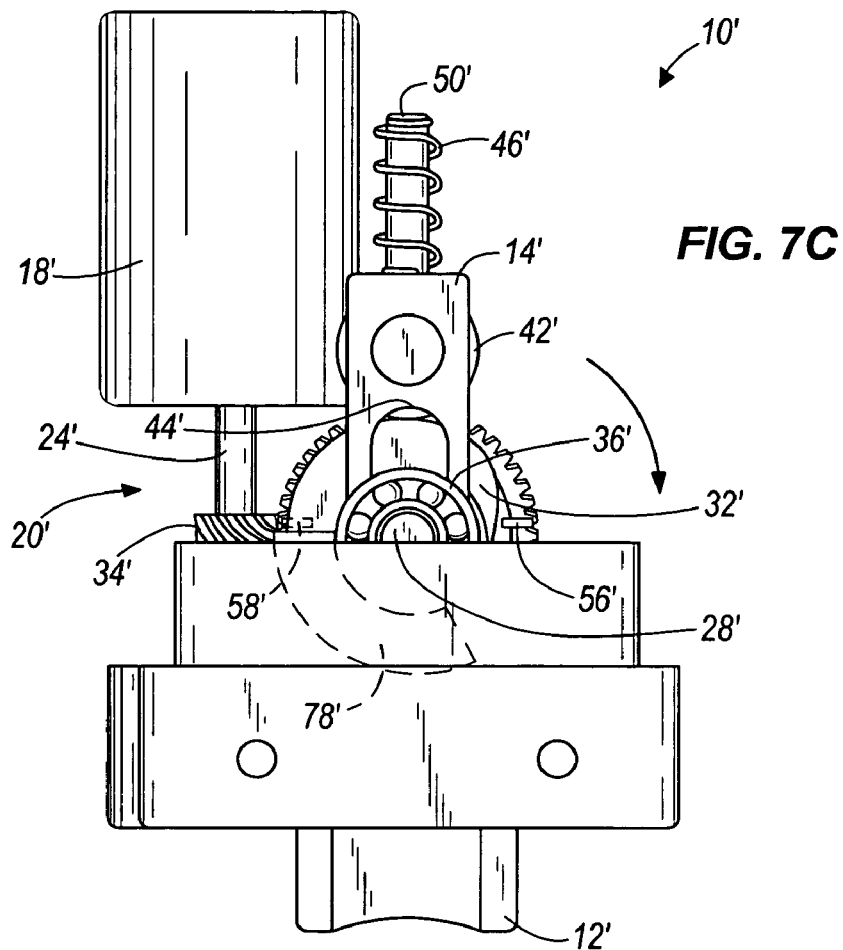
FIG. 7C is a partial cross-sectional end view of the lock assembly illustrated in FIG. 7A, shown with the lock in the unlocked state.
Figure 8C:
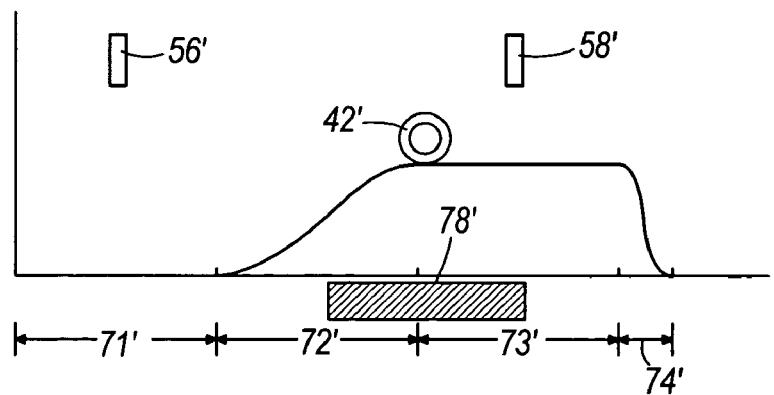
FIG. 8C is a displacement diagram of the cam and follower of the embodiment illustrated in FIGS. 7A–7D, shown with the follower in the position illustrated in FIG. 7C along with the relative positions of the magnet and the sensors.

The operation of the embodiment illustrated in FIGS. 7A–8D will now be briefly described. With reference first to FIG. 7A, the follower 42' is located in the first sector 71', while at least a portion of the magnet 78' is located adjacent to the first sensor 56' (i.e., sufficiently close to the first sensor 56' to be detected thereby). In this position, the lock assembly 10' is in a locked state. In some embodiments, (such as the embodiment illustrated in FIGS. 7A–8D), the magnet 78' and first sensor 56' can be circumferentially positioned so that the first sensor 56' is substantially centered with respect to the magnet 78' when the follower 42' is substantially centered on the first sector 71'. Also, in some embodiments, (such as the embodiment illustrated in FIGS. 7A–8D), the magnet 78' and first sensor 56' can be circumferentially positioned so that the first sensor 56' begins to sense the magnet 78' when the follower 42' transitions to the first sector 71' from either rotational direction, or immediately before the follower 42' transitions to the first sector 71' from either rotational direction. Furthermore, the magnet 78' and first sensor 56' can be circumferentially positioned so that the first sensor 56' stops detecting the magnet 78' when the follower 42' transitions away from the first sector 71' in either rotational direction, or immediately before the follower 42' transitions away from the first sector 71' in either rotational direction. In both cases, a control system to which the first sensor 56' is electrically connected senses when the follower 42' has reached or is about to reach the first sector 71' in which the lock bolt 14' is free to enter a locked state.

As described herein, in some embodiments the magnet 78' and first sensor 56' are positioned so that the first sensor 56' begins to sense the magnet 78' when (or immediately before) the follower 42' transitions to the first sector 71', and stops detecting the magnet 78' when (or immediately before) the follower 42' transitions away from the first sector 71' in either rotational direction. In such embodiments, the magnet 78' can be similar in circumferential size to the first sector 71'.

Actuation of the actuator 18' causes the follower 42' to ride upon the first sector 71' (i.e., the locked portion) of the cam 32' where it does not displace the lock bolt 14' (or does not displace the lock bolt 14' to any significant extent). As the follower 42' reaches the end of the first sector 71' and enters the second sector 72', the first sensor 56' no longer senses the magnet 78' (by virtue of the fact that the magnet 78' extends about 110 degrees around the pivot 28' in the illustrated exemplary embodiment).

As the cam 32' continues to rotate, the follower 42' begins to move along the ramped surface of the second sector 72', thereby displacing the bolt 14'. As the follower 42' reaches the end of the ramped second sector 72', the second sensor 58' senses the leading end of the magnet 78' (again, by virtue of the fact that the magnet 78' extends about 110 degrees about the pivot 28' in the illustrated exemplary embodiment). This indicates that the lock bolt 14' is in the unlocked position, and can cause a signal to be sent to the actuator 18' to stop the cam 32' from rotating. In some embodiments, as will be discussed in greater detail below, the actuator 18' can be turned off, short circuited, or temporarily reversed to stop the cam 32' from rotating. Since the cam 32' and the power transmission assembly 20' have inertia, it may take time for rotation of the cam 32' to stop in the absence of a mechanical stop to abut against. Therefore, the third sector 73' of the cam 32' in the illustrated exemplary embodiment of FIGS. 7A–8D extends about 110 degrees around the pivot 28' to provide a sufficient stopping distance.

In some embodiments, (such as the embodiment illustrated in FIGS. 7A–8D), the magnet 78' and second sensor 58' can be circumferentially positioned so that the second sensor 58' is substantially centered with respect to the magnet 78' when the follower 42' is substantially centered on the third sector 73'. Also, in some embodiments, (such as the embodiment illustrated in FIGS. 7A–8D), the magnet 78' and second sensor 58' can be circumferentially positioned so that the second sensor 58' begins to sense the magnet 78' when the follower 42' transitions to the third sector 73' from either rotational direction, or immediately before the follower 42' transitions to the third sector 73' from either rotational direction. Furthermore, the magnet 78' and second sensor 58' can be circumferentially positioned so that the second sensor 58' stops detecting the magnet 78' when the follower 42' transitions away from the third sector 73' in either rotational direction, or immediately before the follower 42' transitions away from the third sector 73' in either rotational direction. In both cases, a control system to which the second sensor 58' is electrically connected senses when the follower 42' has reached or is about to reach the third sector 73' in which the lock bolt 14' is in an unlocked state. In those embodiments where the magnet 78' and second sensor 58' are positioned so that the second sensor 58' begins to sense the magnet 78' when (or immediately before) the follower 42' transitions to the third sector 73', and stops detecting the magnet 78' when (or immediately before) the follower 42' transitions away from the third sector 73' in either rotational direction, the magnet 78' can be similar in circumferential size to the third sector 73'. In such cases, if the second sensor 58' does not detect the magnet 78', then the system will determine that the cam 32' turned too far and the bolt 14' may not be in the unlocked state. Thus, the actuator 18' can cycle again in the same direction to move the lock bolt 14' to the unlocked state, or can temporarily reverse rotation to until the magnet 78' is sensed by the second sensor 58' again.

With continued reference to the illustrated exemplary embodiment of FIGS. 7A–8D, to move the lock bolt 14' from the unlocked position to the locked position, the actuator 18' can be actuated to cause the cam 32' to rotate in either direction. If the cam 32' were to continue rotating in the same direction as the prior unlocking operation, the follower 42' would ride through the remainder of the third sector 73' without further displacement (or without significant further displacement) of the lock bolt 14' and into the fourth sector 74'. As the follower 42' rides through the fourth sector 74', the bolt 14' moves from the unlocked position toward the locked position. As the follower 42' leaves the fourth sector 74' and enters the first sector 71', the leading edge of the magnet 78' passes by the first sensor 56'. This indicates that the lock bolt 14' is in the locked position and is capable of being biased into a locked state. Thus, a signal can be sent to stop the actuator 18'. Again, the cam 32' and the power transmission assembly 20' can have some momentum. Therefore, if the first sector 71' is sufficiently long (in a circumferential sense), the cam 32' can stop with the follower 42' adjacent any portion of the cam surface within the first sector 71'.

Figure 7D:
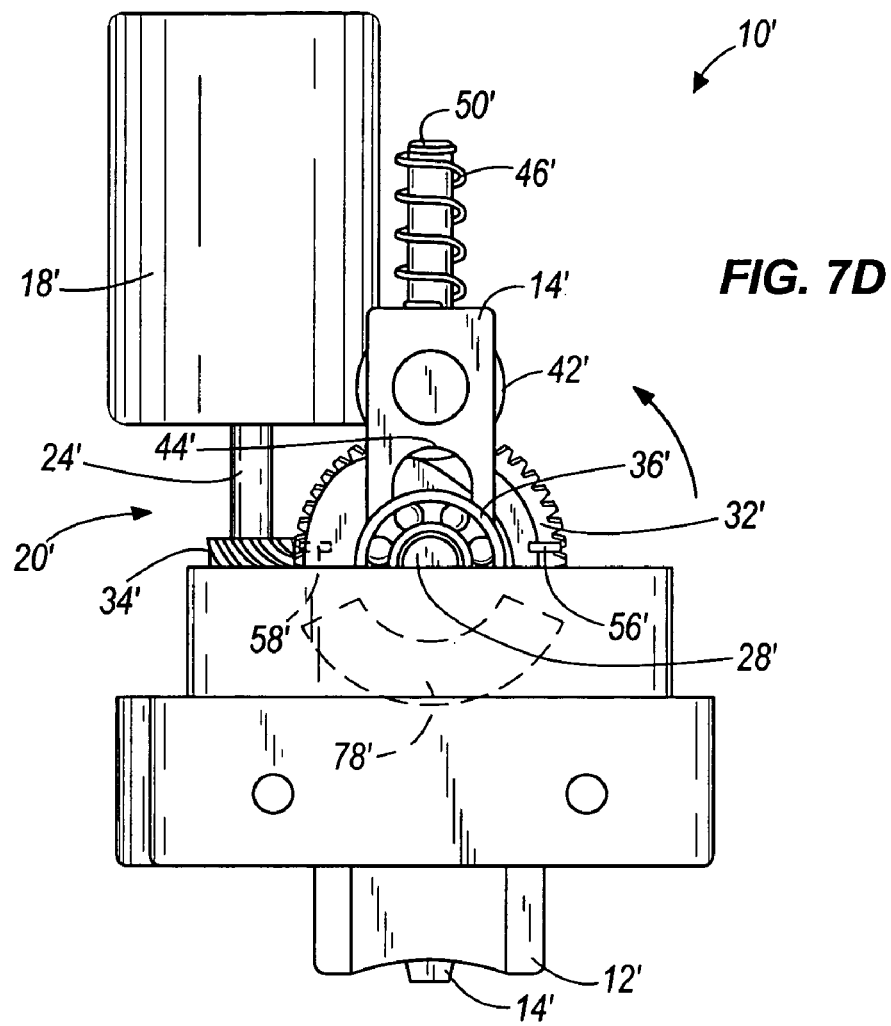
FIG. 7D is a partial cross-sectional end view of the lock assembly illustrated in FIG. 7A, shown with the lock transitioning from the unlocked state to the locked state.
Figure 8D:
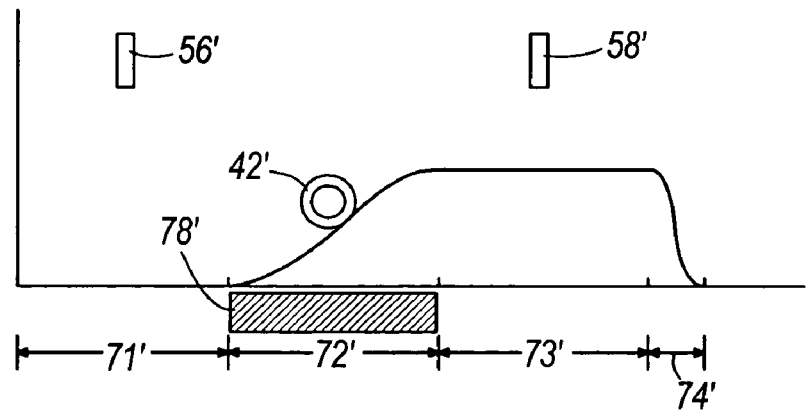
FIG. 8D is a displacement diagram of the cam and follower of the embodiment illustrated in FIGS. 7A–7D, shown with the follower in the position illustrated in FIG. 7D along with the relative positions of the magnet and the sensors.

In some embodiments, to lock the lock assembly 10', the cam 32' can be driven in a direction opposite that used to unlock the lock assembly 10'. As shown in FIG. 7D, in such cases the follower 42' rides back through the third sector 73' toward the second sector 72' without further displacement (or without significant further displacement) of the bolt 14'. As the follower 42' rides through the second sector 72', the lock bolt 14' moves gradually from the unlocked state to the locked state. As the follower 42' leaves the second sector 72' and enters the first sector 71', the edge of the magnet 78' passes by the first sensor 56' and is sensed by the first sensor 56'. This indicates that the bolt 14' is in the locked state and is capable of being biased into a locked position. Thus, a signal can be sent to stop the actuator 18'. Again, the cam 32' and the power transmission assembly 20' can have some momentum. Therefore, if the first sector 71' of the cam 32' is sufficiently long (in a circumferential sense), the cam 32' can stop with the follower 42' adjacent any portion of the cam surface within the first sector 71'.

In some embodiments, when a sensor 56', 58' no longer detects the presence of the magnet 78' as the cam 32' rotates (indicating that the cam 32' has rotated too far), one or more signals can be sent to cause the actuator 18' to reverse in direction until the sensor 56', 58' detects the presence of the magnet 78' again, in which case the actuator 18' can be stopped to bring the follower 42' to rest upon a sector 71', 72', 73', 74' associated with the sensor 56', 58'. Although a number of different electronic circuits and methods can be used to operate the actuator 18' as just described, in some embodiments an H-Bridge (described in greater detail below) can be employed for this purpose. Also, such reverse jogging can be employed to position the cam 32' in any rotational position desired, thereby stopping the follower 42' at any number of possible positions upon the cam 32'.

Although the magnet 78' and the sensors 56', 58' are illustrated as having a specific relationship with respect to certain sectors of the cam 32', this arrangement is not required. Rather, the relationship between the sensors 56', 58' and the magnet 78' is more important. Thus, the sensors 56', 58' and magnet 78' can be moved to different rotational positions with respect to the cam 32' while still enabling the same functions described herein.

In alternative embodiments to the embodiments illustrated in FIGS. 1–8D and described above, the sensors 56, 58, 56', 58' can be located in different positions within their corresponding sectors 71, 73, 71', 73'. Also, each sensor 56, 58, 56', 58' can be positioned anywhere in their adjacent ramped sectors 72, 74, 72', 74' as desired (in which case earlier detection of the magnet 78, 78' approaching the first or third sectors 71, 73, 71', 73' can enable sufficient time for the cam 32 to decelerate once the follower 42 has reached the locked and unlocked sectors 71, 73, 71', 73'). In some embodiments, the sensors 56, 56', 58, 58' and magnet 78, 78' are positioned with respect to the cam 32, 32' such that the follower 42, 42' is anywhere in an adjacent ramped sector 72, 72', 74, 74' of the cam 32, 32' when the sensor 56, 56', 58, 58' first detects the magnet 78, 78'.

Sensors 56, 58, 56', 58' are just one manner of triggering actuator shutoff in the lock assembly 10, 10' of the present invention. Other manners of triggering actuator 18, 18' shutoff exist and can be used in place of or in addition to the use of sensors. For example, the actuator 18, 18' can have a predetermined amount of rotation or travel in its rotation of the power transmission assembly 20, 20'. In this regard, the actuator 18, 18' can be a stepper motor rotating only that amount necessary to retract or permit extension of the lock bolt 14, 14' to desired unlocked and locked positions, can be a solenoid extending and retracting an armature an amount sufficient to perform these same functions, and the like. In another example, the actuator 18, 18' can be connected to a controller (e.g., the vehicle security controller or another controller) that supplies power to the actuator 18, 18' for a predetermined amount of time corresponding to the time necessary to retract the lock bolt 14, 14' or to permit extension of the lock bolt 14, 14'. As another example, a torsion spring can be mounted to the power transmission assembly 20, 20' and to the frame 12, 12' to exert an increasing torque upon the power transmission assembly 20, 20' that eventually prevents further rotation of the power transmission assembly 20, 20' after a desired amount of rotation. As yet another example, the aperture 44, 44' in the lock bolt 14, 14' can be sized such that the pivot 28, 28' stops against an end of the aperture 44, 44' after the lock bolt 14, 14' has moved a desired amount, thereby preventing further movement of the lock bolt 14, 14' in the same direction. In the latter two examples in particular, actuator shutoff can be triggered automatically by detection of actuator overload, by timing out of actuator operation, and in other conventional manners well known to those skilled in the art. Still other manners of retracting and permitting extension of the lock bolt 14 with or without the use of sensors would be recognized by those skilled in the art and fall within the spirit and scope of the present invention.

Figure 9:
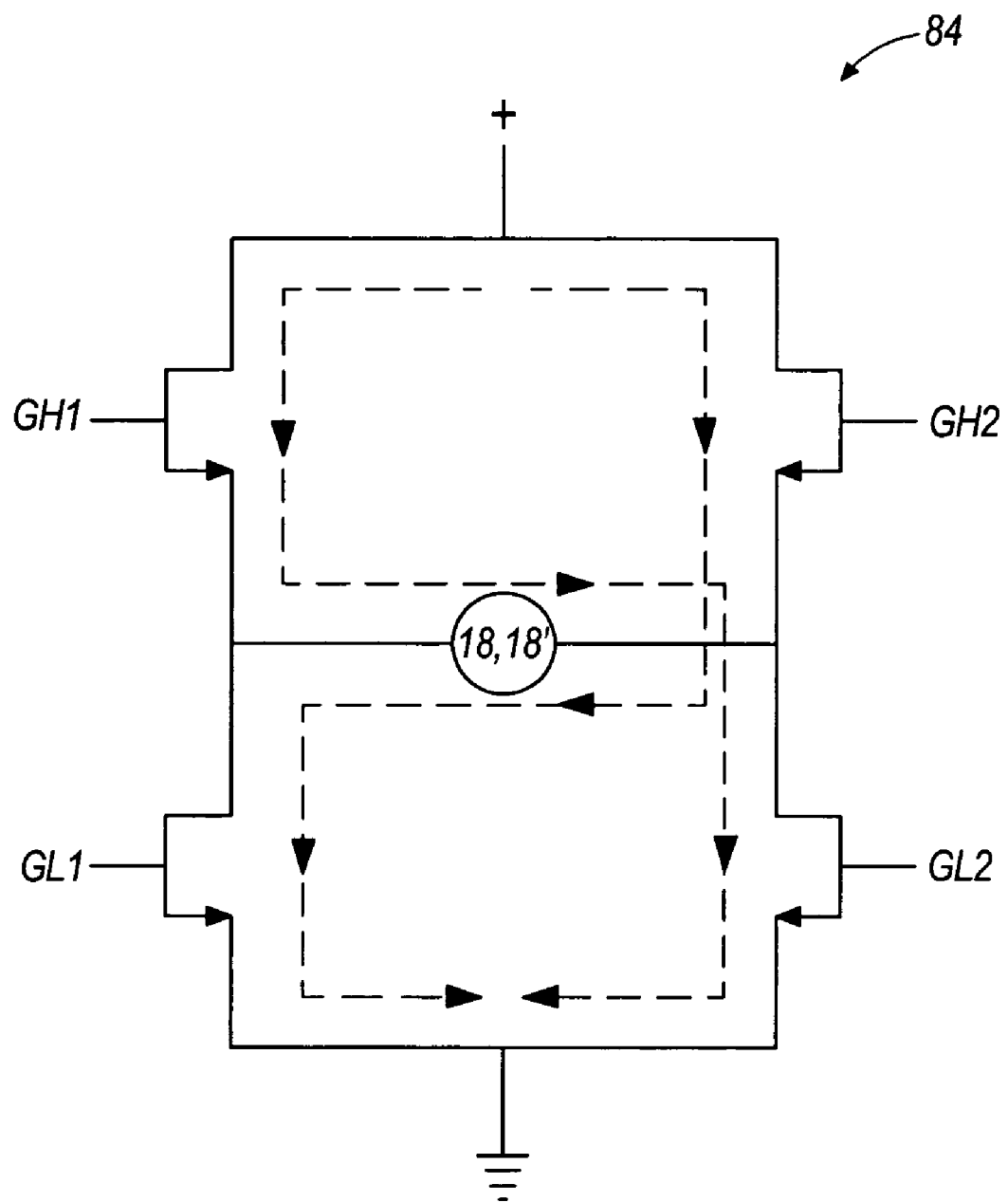
FIG. 9 is a schematic illustration of an H-Bridge circuit.

Some embodiments of the present invention employ an H-Bridge 84 circuit to cause the actuator 18, 18' to shut off (and/or in some cases, to reverse the actuator 18, 18'). As illustrated in FIG. 9, the H-Bridge can have four logic inputs and two voltage terminals. The logic inputs can be two high gates GH1 and GH2 and two low gates GL1 and GL2, while the voltage terminals are a positive voltage terminal and a ground terminal. The actuator is separated from the positive voltage by the high gates GH1 and GH2, and is separated from the ground terminal by the low gates GL1 and GL2. When logic is applied to GH1 and GL2, the actuator 18, 18' is actuated in a first direction. Similarly, when logic is applied to GH2 and GL1, the actuator 18, 18' is actuated in an second direction opposite the first direction. When logic is applied to GH1 and GH2, however, the actuator 18, 18' is shorted out. Depending at least in part upon the type of actuator 18, 18' employed, shorting the actuator 18, 18' can cause the actuator 18, 18' to decelerate and stop relatively quickly. For example, in the case of an electric motor actuator 18, 18', shorting out the electric motor 18, 18' can generate a braking force upon the motor 18, 18', and therefore upon the power transmission assembly 10, 10'. With continued reference to the exemplary circuit illustrated in FIG. 9, when logic is applied to GL1 and GL2, the motor 18, 18' can also be shorted out to stop the actuator 18, 18'.

In some embodiments, a microcontroller (not shown) sends logic signals to the H-Bridge 84 to control motion of the actuator 18, 18'. The microcontroller can be coupled to the circuit board 62, 62' located within the steering column lock assembly 10, 10'. The sensors 56, 58, 56', 58' discussed above can be coupled to the circuit board 62, 62' and can communicate the position of the lock bolt 14, 14' to the microcontroller. For example, if the actuator 18, 18' were driving the cam 32, 32' and the lock bolt 14, 14' from the locked position to the unlocked position, the second sensor 58, 58' would indicate when the lock bolt 14, 14' has reached the unlocked position. As such, the microcontroller could then send one or more signals to the H-Bridge 84 to short the actuator 18, 18'. The same is also true if the lock bolt 14, 14' were moving from the unlocked state to the locked state.

In operation of the illustrated embodiments of FIGS. 1–8D employing an H-Bridge such as that shown in FIG. 9, when the lock assembly 10 is to be unlocked, one or more signals are transmitted (by a connected vehicle security controller for example) to the actuator 18, 18' to initiate retraction of the lock bolt 14, 14'. A logic signal is sent from the microcontroller to the H-Bridge 84 to power the actuator 18, 18' in a first direction. The actuator 18, 18' responds by turning the worm 34, 34' and gear 30, 30' to rotate the pivot 28, 28' and cam 32, 32'. A follower 42, 42' rides upon the cam 32, 32' to move the lock bolt 14, 14' to a retracted position. The speed reduction offered by the worm 34, 34' and gear 30, 30' and the gradual ramping provided by the cam 32, 32' provides significant torque to the pivot 28, 28'. This torque is sufficient to draw the lock bolt 14, 14' from engagement with a steering column or element connected thereto even if the lock bolt 14, 14' is held by relatively large binding forces. The power transmission assembly 20, 20' can rotate until the second sensor 58, 58' detects that the lock bolt 14, 14' is retracted. In some embodiments, the second sensor 58, 58' detects the magnetic field of a magnet 78, 78' coupled to the power transmission assembly 20, 20'. Once the second sensor 58, 58' detects that the lock bolt 14, 14' is retracted and unlocked, it responds by sending one or more signals to the controller, microcontroller, or to the actuator 18, 18' to stop the actuator 18, 18'. The lock assembly 10, 10' is therefore in an unlocked state permitting the steering column to be rotated.

To lock the steering column again, one or more signals can be transmitted to the electric motor 18, 18' to initiate rotation of the power transmission assembly 20, 20' (in the same or opposite direction as described above depending at least in part upon the shape of the cam 32, 32'). The worm 34, 34' is turned by the actuator 18, 18', thereby turning the gear 30, 30', pivot 28, 28', and cam 32, 32'. In this rotation, the cam 32, 32' permits the lock bolt 14, 14' to extend toward a locked position under biasing force from the spring 46, 46'. The power transmission assembly 20, 20' preferably rotates until a sensor 56, 56' detects that the power transmission assembly 20, 20' has rotated sufficiently to enable the bolt 14, 14' to assume the locked position. The sensor 56, 56' can be triggered by a magnet 78, 78' located on the power transmission assembly 20, 20'. The sensor 56, 56' can be tripped once the lock bolt 14, 14' is permitted to fully extend to a locked position (although the lock bolt 14, 14' may not be properly aligned to actually move to this position, the cam 32, 32' has been sufficiently rotated to permit such movement). The tripped sensor 56, 56' responds by sending one or more signals to the controller, microcontroller, or to the actuator 18, 18' to stop the actuator 18, 18'. The lock assembly 10, 10' is therefore in a locked state preventing rotation of the steering column. In the event that the lock bolt 14, 14' does not engage with the aperture, groove, teeth, or other structure of the steering column (or element connected thereto) due to misalignment of the lock bolt 14, 14' therewith, the lock bolt 14, 14' can remain biased by the spring 46, 46' toward its locked position. Therefore, when the lock bolt 14, 14' becomes properly aligned with the aperture, groove, teeth, or other structure, the lock bolt 14, 14' will fully extend to its locked position to lock the steering column.

In some embodiments of the present invention (such as those described above with reference to FIGS. 1–9), the amount of control of the actuator 18, 18' can be significantly increased by employing a controller that is capable of sending pulse width modulation signals to the actuator 18, 18'. For example, a microcontroller or other controller can normally operate to send pulse width modulation signals to the actuator 18, 18' to control the amount of power to the actuator 18, 18', and therefore to control the power output and/or speed of the actuator 18, 18'. Alternatively, pulse width modulation signals can be sent by such a microcontroller or other controller only at certain times (e.g., upon initial detection of a moving magnet 58, 58' by a sensor 56, 56', 58, 58', upon loss of detection of the magnet 58, 58' by the sensor 56, 56', 58, 58', at one or more rotational positions or ranges of such rotational positions of the power transmission assembly 20, 20', and the like). By employing pulse width modulation to power the actuator 18, 18', the output power and speed of the actuator 18, 18' can be controlled as desired, such as to reduce power to the actuator 18, 18' as the follower 42, 42' approaches the third sectors 73, 73', to increase power to the actuator 18, 18' as the follower 42, 42' approaches the second sector 72, 72', to decrease power to the actuator 18, 18' when (and if) the actuator 18, 18' is reversed as a result of overshooting a desired position on the first or third sectors 71, 71', 73, 73', to decrease power to the actuator 18, 18' when (and if) the actuator 18, 18' is cycled through sectors 71, 71', 72, 72', 73, 73', 74, 74' after overshooting a desired position on the first or third sectors 71, 71', 73, 73', and the like. Such pulse width modulated power to the actuator 18, 18' can be employed to any degree and at any time(s) desired.

The frame 12, 12', cover 48, 48', power transmission assembly 20, 20', and worm 34, 34' can be manufactured from a strong and resilient material such as steel, aluminum, or other metal, plastic, urethane, fiberglass, or composites (useful for meeting non-sparking application requirements or in applications where the lock assembly 10, 10' cannot be made of conductive material), and the like. In some embodiments, however, the frame 12, 12' and cover 48, 48' are made of a high-strength plastic and the power transmission assembly 20, 20' is made of a cast zinc or other metal.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the illustrated power transmission assembly 20, 20' has an identifiable pivot 28, 28' upon which the gear 30, 30' and cam 32, 32' are located. However, other embodiments of the power transmission assembly 20, 20' may not have a pivot 28, 28' that is a separate element or that is otherwise separately identifiable from the gear 30, 30', cam 32, 32', or other portion of the power transmission assembly 20, 20'. The term "pivot" as used herein and in the appended claims refers to a separately identifiable element with or about which other elements of the power transmission assembly 20, 20' rotate, as well as one or more portions of the gear 30, 30', cam 32, 32', or other power transmission assembly parts performing the same function as such an element. Accordingly, in some embodiments the power transmission assembly 20, 20' can have only a gear 30, 30' and a cam 32, 32' functioning as described above. In such cases, the gear 30, 30' can abut or be located immediately beside the cam 32, 32'. Alternatively, the gear 30, 30' and cam 32, 32' can be a single integral or assembled element, such as a gear having a stepped side acting as a cam or a cam having a toothed shoulder serving as a gear. Also, it should be noted that where speed reduction to the power transmission assembly 20, 20' is not necessary or in those cases where the actuator 18, 18' is directly drivably connected to the power transmission assembly 20, 20', the power transmission assembly 20, 20' can even be just a cam 32, 32' pivotably mounted to the frame 12, 12'.

We claim:

1. A vehicular lock, comprising:
 a frame;
 a lock bolt movable from an extended and locked position to a retracted and unlocked position;
 a follower movable with the lock bolt;
 a pivot rotatably coupled to the frame;
 an actuator drivably coupled to the pivot; and
 a cam coupled to the pivot, driven by rotation of the pivot, and in contact with the follower, the cam rotatable to move the lock bolt from the extended and locked position to the retracted and unlocked position,
 the cam having an asymmetric profile with respect to the pivot, the asymmetric profile defined at least in part by
 a first sector corresponding to the locked position of the lock bolt,
 a second sector corresponding to the unlocked position of the lock bolt,
 a third sector having a changing radial dimension defining a ramped surface from an end of the first sector to a beginning of the second sector, and
 a fourth sector extending between an end of the second sector to a beginning of the first sector,
 wherein the third sector is defined by a greater circumferential portion of the cam than the fourth sector,
 wherein the cam is driven in a single direction to move the lock bolt between the extended and locked position and the retracted and unlocked position.

2. A steering column lock, comprising:
 a frame;
 a lock bolt moveable from an extended and locked position to a retracted and unlocked position;
 a follower movable with the lock bolt;
 a pivot rotatably coupled to the frame;
 an actuator drivably coupled to the pivot; and
 a cam coupled to the pivot, driven by rotation of the pivot, and in contact with the follower, the cam rotatable to move the lock bolt from the extended and locked position to the retracted and unlocked position,
 the cam having an asymmetric profile with respect to the pivot, the asymmetric profile defined at least in part by
 a first sector corresponding to the locked position of the lock bolt,
 a second sector corresponding to the unlocked position of the lock bolt, and
 a third sector having a changing radial dimension defining a ramped surface from an end of the first sector to a beginning of the second sector,
 wherein the third sector is defined by a greater circumferential portion of the cam than each of the first and second sectors;
 the actuator driving the cam in a single direction to move the lock bolt between the extended and locked position and the retracted and unlocked position.

3. The vehicular lock as claimed in claim 2, further comprising a fourth sector extending between an end of the second sector and a beginning of the first sector, the fourth sector having a changing radial dimension defining a ramped surface between the end of the second sector and the beginning of the first sector.

4. The vehicular lock as claimed in claim 3, wherein the third sector is defined by a greater circumferential portion of the cam than the fourth sector.

5. The vehicular lock as claimed in claim 2, further comprising a spring positioned to exert a bias force on the lock bolt toward the locked position.

6. The vehicular lock as claimed in claim 2, wherein the actuator is a motor.

7. The vehicular lock as claimed in claim 2, further comprising a controller coupled to the actuator and controlling operation of the actuator via pulse width modulation.

8. The vehicular lock as claimed in claim 2, wherein the first and second sectors are each greater than about 30 degrees and less than about 110 degrees, and the third sector is greater than about 30 degrees and less than about 70 degrees.

9. The vehicular lock as claimed in claim 8, wherein the first and second sectors are each between 60 and 120 degrees, and the third sector is between 60 and 180 degrees.

10. The vehicular lock as claimed in claim 2, further comprising at least one sensor positioned to detect a position of the lock bolt.

11. The vehicular lock as claimed in claim 10, further comprising a magnet coupled to one of the pivot, the cam, and the lock bolt, the sensor positioned to detect the magnet field of the magnet to determine the position of the lock bolt.

12. The vehicular lock as claimed in claim 11, further comprising a controller coupled to the actuator and the sensor, the controller responsive to at least one signal from the sensor to control operation of the actuator.

13. The vehicular lock as claimed in claim 12, further comprising an H-bridge coupled to the controller to short circuit the actuator in order to brake rotation of the cam.

14. The vehicular lock as claimed in claim 2, wherein the lock is a steering column lock.

15. The vehicular lock as claimed in claim 2, wherein the third sector generates gradual radial movement of the follower with respect to the pivot.

16. The vehicular lock as claimed in claim 2, wherein the follower is a roller coupled to the lock bolt.

17. The vehicular lock as claimed in claim 2, wherein the follower is integral with and extends from the lock bolt.

18. The vehicular lock as claimed in claim 10, wherein the at least one sensor detects the position of the lock bolt by detecting a rotational position of at least one of the cam and the pivot.

* * * * *